(12) United States Patent
Qureshi et al.

(10) Patent No.: US 11,956,766 B2
(45) Date of Patent: Apr. 9, 2024

(54) HYBRID BEAMFORMING

(71) Applicant: NOKIA SOLUTIONS AND NETWORKS OY, Espoo (FI)

(72) Inventors: Muhammad Ayyaz Qureshi, Neu-Ulm (DE); Martin Steiert, Blaustein (DE); Tilman Felgentreff, Holzkirchen (DE); Suresh Kalyanasundaram, Bangalore (IN); Jinesh P. Nair, Bangalore (IN); Shalini Gulati, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/118,373

(22) Filed: Mar. 7, 2023

(65) Prior Publication Data

US 2023/0284199 A1 Sep. 7, 2023

(30) Foreign Application Priority Data

Mar. 7, 2022 (FI) ...................................... 20225200

(51) Int. Cl.
*H04W 72/044* (2023.01)
*H04W 16/28* (2009.01)
*H04W 72/52* (2023.01)

(52) U.S. Cl.
CPC ......... *H04W 72/046* (2013.01); *H04W 72/52* (2023.01); *H04W 16/28* (2013.01)

(58) Field of Classification Search
CPC .... H04W 72/046; H04W 72/52; H04W 16/28
See application file for complete search history.

(56) References Cited

U.S. PATENT DOCUMENTS

| 11,558,088 B1* | 1/2023 | Gutman | H04L 5/14 |
| 2018/0176920 A1* | 6/2018 | Dong | H04W 16/28 |

(Continued)

FOREIGN PATENT DOCUMENTS

| CN | 111615857 A | 9/2020 |
| EP | 3496293 A1 | 6/2019 |

(Continued)

OTHER PUBLICATIONS

Communication of Acceptance—section 29 a of Patents Decree dated Nov. 24, 2022 corresponding to Finnish Patent Application No. 20225200.

(Continued)

*Primary Examiner* — Jasper Kwoh
(74) *Attorney, Agent, or Firm* — SQUIRE PATTON BOGGS (US) LLP

(57) ABSTRACT

A method comprises selecting a beam to be scheduled for a slot that is upcoming, and selecting a terminal device to be scheduled in the selected beam. Selection of the terminal device is based on the terminal device considering the selected beam as its best beam. Physical resource blocks are allocated to the terminal device, and a beam configuration to be used for the selected beam is chosen based in part on user traffic and load distribution. A switching event is triggered. The switching event comprises producing the chosen beam configuration by providing a beamforming command and using a control line controlling a switch network comprised in phase shifters to steer the beam. The phase shifters are comprised in a radio frequency front-end unit comprising a plurality of antenna columns. The phase shifters are placed in front of selected antenna sub-arrays comprised in the plurality of antenna columns.

15 Claims, 16 Drawing Sheets

S1  Select, based on beam metric, an analogue beam to be scheduled in a slot.

S2  For the selected beam, arrange users in a descending order according to their SU-PF.

S3  Select a beam configuration to be used.

(56) References Cited

U.S. PATENT DOCUMENTS

| | | | |
|---|---|---|---|
| 2019/0174346 A1* | 6/2019 | Murray | H04B 7/0408 |
| 2019/0182816 A1 | 6/2019 | Choe et al. | |
| 2019/0268052 A1* | 8/2019 | Ho | H04B 7/0617 |
| 2020/0403689 A1 | 12/2020 | Rofougaran et al. | |
| 2021/0028847 A1* | 1/2021 | Bedekar | H04L 5/0037 |
| 2021/0203396 A1 | 7/2021 | Ni et al. | |
| 2021/0368393 A1* | 11/2021 | Kotecha | H04B 17/3913 |

FOREIGN PATENT DOCUMENTS

| | | |
|---|---|---|
| WO | 2019/160741 A1 | 8/2019 |
| WO | 2020/225825 A1 | 11/2020 |
| WO | 2021/155745 A1 | 8/2021 |

OTHER PUBLICATIONS

Office Action dated Jun. 16, 2022 corresponding to Finnish Patent Application No. 20225200.
Finnish Search Report dated Jun. 16, 2022 corresponding to Finnish Application No. 20225200.
Extended European Search Report issued in corresponding European Patent Application No. 23159566.1 dated Jul. 5, 2023.
First Office Action issued in corresponding Chinese Patent Application No. 202310212220.X dated Feb. 7, 2024, with English language summary thereof.

* cited by examiner

FIG. 6
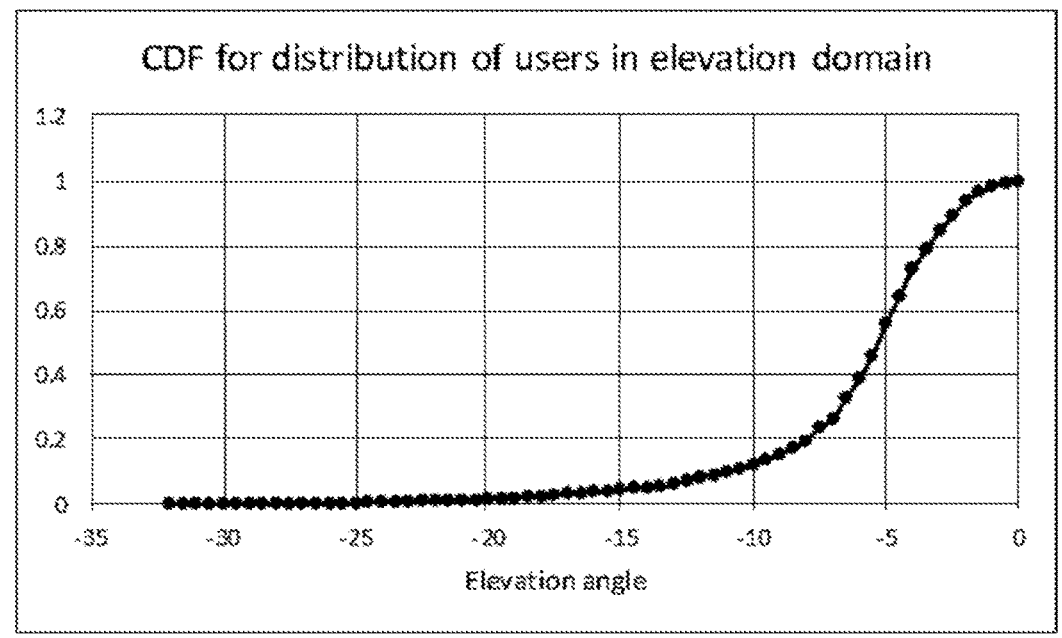
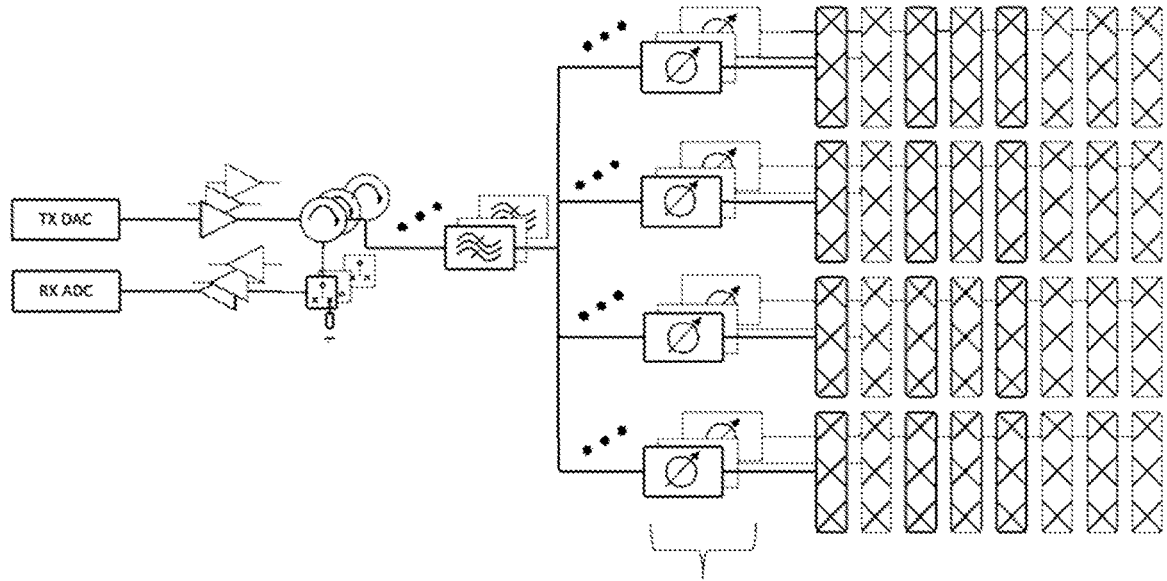
FIG. 7

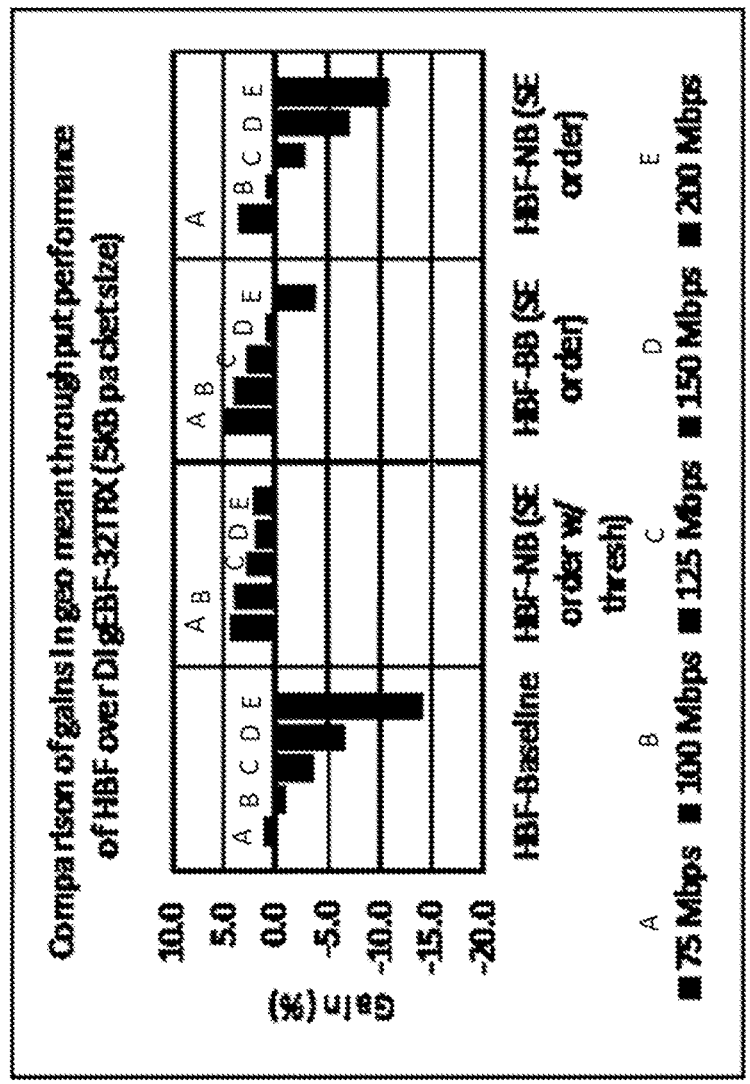
FIG. 14A
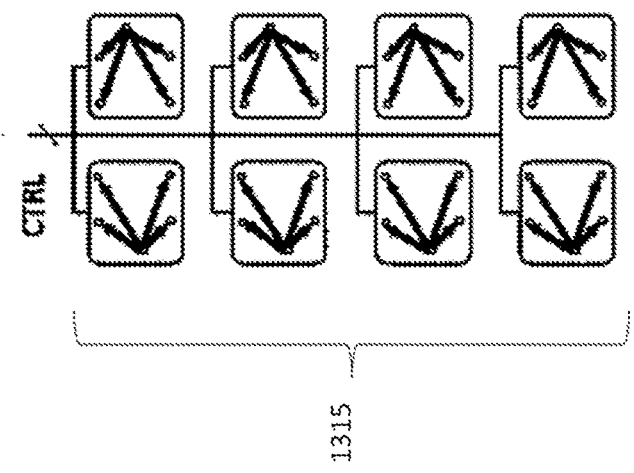
FIG. 13
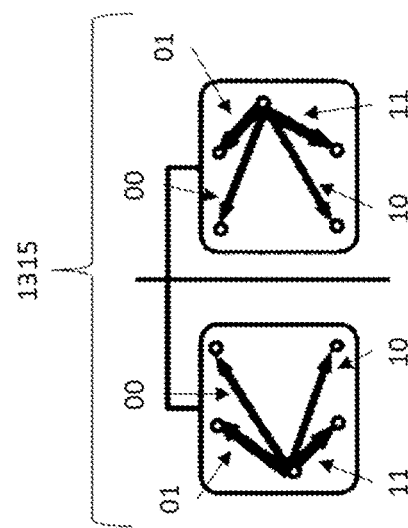

HYBRID BEAMFORMING

CROSS REFERENCE TO RELATED APPLICATION

This application claims the benefit of Finnish Patent Application No. 20225200, filed Mar. 7, 2022. The entire content of the above-referenced application is hereby incorporated by reference.

FIELD

The following exemplary embodiments relate to wireless communication and beamforming techniques for enhancing capacity and coverage.

BACKGROUND

Cellular communication networks evolve and also transition from 4G to 5G is ongoing and also 5G advanced phase is taking off. Therefore, techniques that enable improved coverage, enhanced capacity and also reduced power consumption are of interest and also are to be developed to achieve desired capabilities in the wireless communication.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising means for: selecting, based on beam metric, a beam to be scheduled for a slot that is upcoming, selecting a terminal device to be scheduled in the selected beam, wherein the selection of the terminal device is based on the terminal device having considered the selected beam as its best beam, and allocating physical resource blocks to the terminal device, choosing a beam configuration to be used for the selected beam based, at least partly, on user traffic and load distribution, and triggering a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

In some exemplary embodiments according to the first aspect, the means comprises at least one processor, and at least one memory, including a computer program code, wherein the at least one memory and the computer program code are configured, with the at least one processor, to cause the performance of the apparatus.

According to a second aspect there is provided an apparatus comprising at least one processor, and at least one memory including a computer program code, wherein the at least one memory and the computer program code are configured, with the at least one processor, to cause the apparatus to: select, based on beam metric, a beam to be scheduled for a slot that is upcoming, select a terminal device to be scheduled in the selected beam, wherein the selection of the terminal device is based on the terminal device having considered the selected beam as its best beam, and allocate physical resource blocks to the terminal device, choose a beam configuration to be used for the selected beam based, at least partly, on user traffic and load distribution, and trigger a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

According to a third aspect there is provided a method comprising: selecting, based on beam metric, a beam to be scheduled for a slot that is upcoming, selecting a terminal device to be scheduled in the selected beam, wherein the selection of the terminal device is based on the terminal device having considered the selected beam as its best beam, and allocating physical resource blocks to the terminal device, choosing a beam configuration to be used for the selected beam based, at least partly, on user traffic and load distribution, and triggering a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

According to a fourth aspect there is provided a computer program comprising instructions for causing an apparatus to perform at least the following: selecting, based on beam metric, a beam to be scheduled for a slot that is upcoming, selecting a terminal device to be scheduled in the selected beam, wherein the selection of the terminal device is based on the terminal device having considered the selected beam as its best beam, and allocating physical resource blocks to the terminal device, choosing a beam configuration to be used for the selected beam based, at least partly, on user traffic and load distribution, and triggering a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

According to a fifth aspect there is provided a computer program comprising instructions stored thereon for performing at least the following: selecting, based on beam metric, a beam to be scheduled for a slot that is upcoming, selecting a terminal device to be scheduled in the selected beam, wherein the selection of the terminal device is based on the terminal device having considered the selected beam as its best beam, and allocating physical resource blocks to the terminal device, choosing a beam configuration to be used for the selected beam based, at least partly, on user traffic and load distribution, and triggering a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

According to a sixth aspect there is provided a non-transitory computer readable medium comprising program instructions for causing an apparatus to perform at least the following: selecting, based on beam metric, a beam to be scheduled for a slot that is upcoming, selecting a terminal device to be scheduled in the selected beam, wherein the selection of the terminal device is based on the terminal device having considered the selected beam as its best beam, and allocating physical resource blocks to the terminal device, choosing a beam configuration to be used for the selected beam based, at least partly, on user traffic and load distribution, and triggering a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

According to a seventh aspect there is provided a non-transitory computer readable medium comprising program instructions stored thereon for performing at least the following: selecting, based on beam metric, a beam to be scheduled for a slot that is upcoming, selecting a terminal device to be scheduled in the selected beam, wherein the selection of the terminal device is based on the terminal device having considered the selected beam as its best beam, and allocating physical resource blocks to the terminal device, choosing a beam configuration to be used for the selected beam based, at least partly, on user traffic and load distribution, and triggering a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

LIST OF DRAWINGS

In the following, the invention will be described in greater detail with reference to the embodiments and the accompanying drawings, in which FIG. 1 illustrates an exemplary embodiment of a radio access network.

FIG. 6 illustrates an exemplary graph of cumulative distributive function of the elevation angle of users.

FIG. 7 illustrates an exemplary embodiment of an RF front end.

FIG. 13 illustrates an exemplary embodiment of a switch network

FIG. 14A, FIG. 14B and FIG. 14C are graphics that illustrate comparisons of gain in geometric mean of user throughputs of hybrid beamforming solutions according to exemplary embodiments.

DESCRIPTION OF EMBODIMENTS

Figure 1:
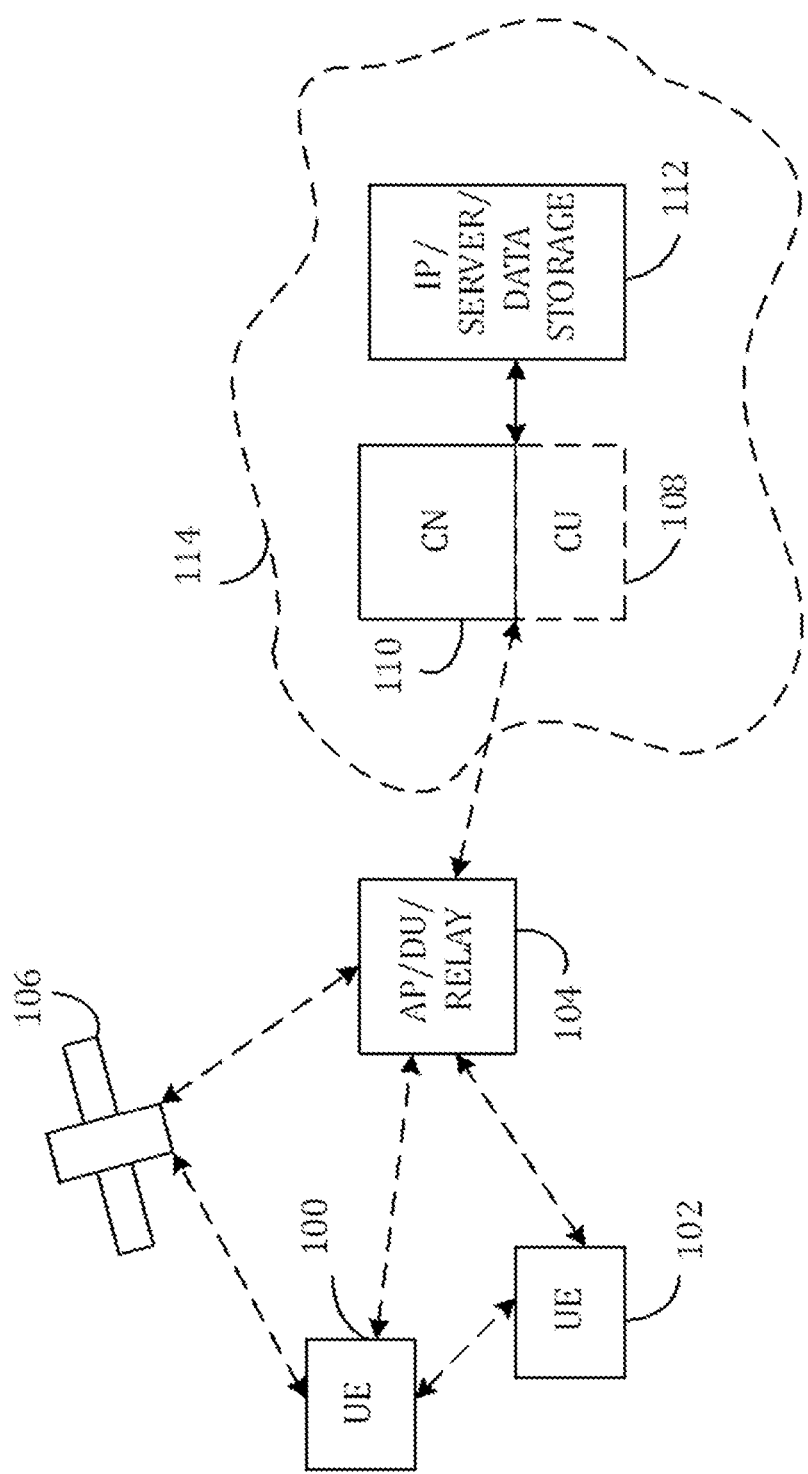

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The wireless link from a terminal device to a (e/g)NodeB is called uplink or reverse link and the wireless link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP -interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces. For example, 5G frequency spectrum involves cmWave and mmWave which are standardized by 3GPP as frequency range 1 (FR1) and frequency range 2 (FR2) respectively. 5G FR1 is shared with existing legacy radio access technologies such as LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability for common frequency spectrum in FR1). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Satellite communication may utilise geostationary earth orbit (GEO) satellite systems, but also low earth orbit (LEO) satellite systems, for example, mega-constellations. A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

When looking to enhance capacity and coverage, massive Multiple Input Multiple Output (mMIMO) and beamforming techniques may be considered as useful techniques for enabling those aims. For example, transition from 4G to 5G has raised interest towards beamforming and mMIMO techniques. Additionally, phase array antennas may form a base line to realize those techniques. For example, beamforming in which multiple columns of antenna elements work together to create a high gain signal may be utilized for enhanced coverage and mMIMO utilizes multiple arrays of antennas, which may also be sub-arrays, to provide either spatial diversity by using multiple paths for the same signal for improved signal quality or increased throughput by transmitting multiple spatial layers which are combined at the receiver end. In some exemplary embodiments, beamforming and mMIMO may be jointly deployed to combine the benefits of both techniques.

Figure 2A:
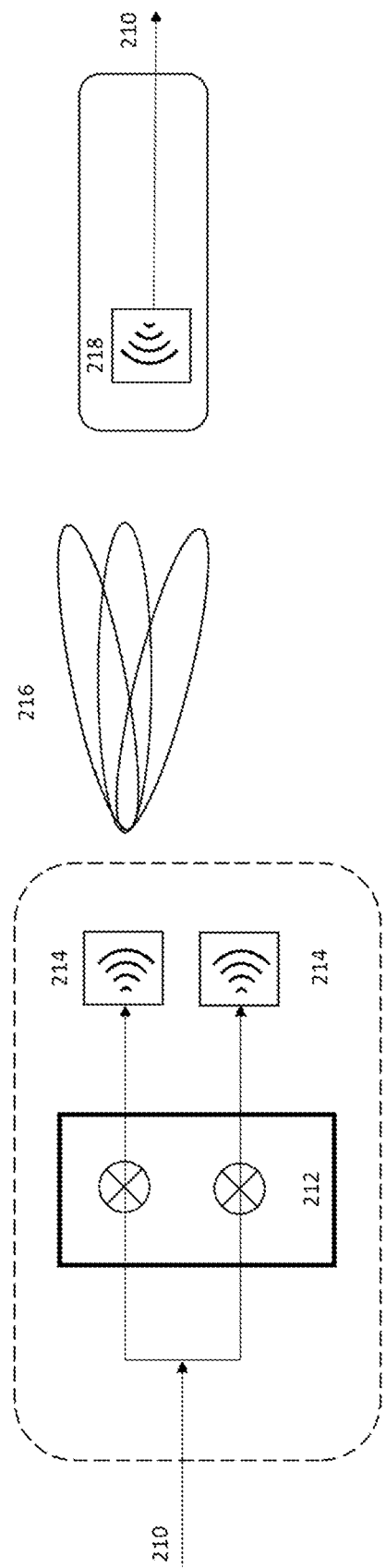
FIG. 2A illustrates an exemplary embodiment of beamforming concept in a high-level block diagram.

FIG. 2A illustrates an exemplary embodiment of beamforming concept in a high-level block diagram. In this exemplary embodiment, there is data 210 to which weights 212 are applied before it is fed into the transmitting antennas 214. A beam is understood to be one antenna pattern carrying one data stream and in this exemplary embodiment, there are multiple beams 216 created by superposition of fields from several antenna elements to increase network coverage. Then, there is in a terminal device a receiving antenna 218 that receives the data 210. The terminal device may be for example of MIMO rank 1.

Figure 2B:
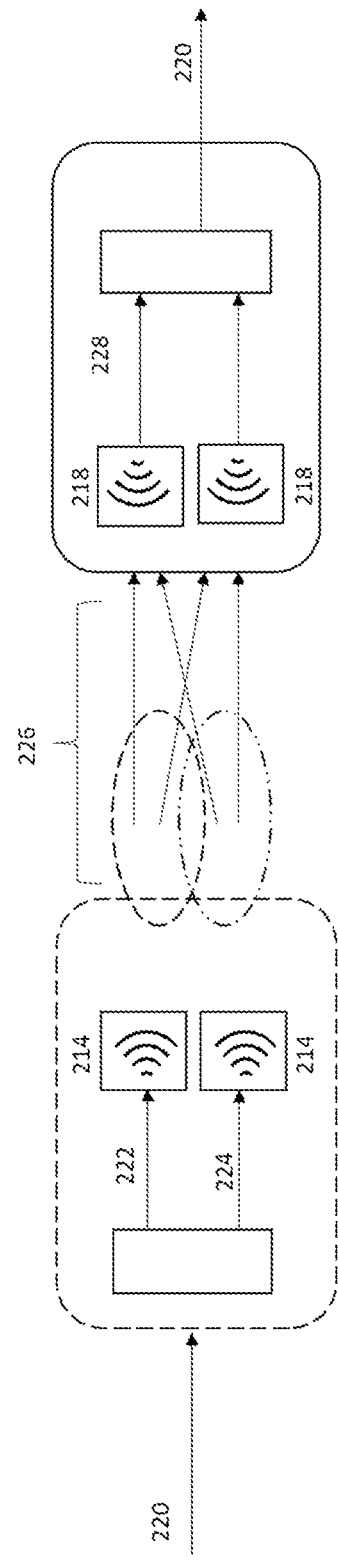
FIG. 2B illustrates an exemplary embodiment of spatial multiplexing in a high-level block diagram illustrating mMIMO.

FIG. 2B illustrates an exemplary embodiment of spatial multiplexing in a high-level block diagram illustrating mMIMO. In this exemplary embodiment, there is data 220 that is then formatted into two separate streams, a first data stream 1 and a second data stream 2. Using then transmitting antennas 214, the data is transmitted using several beams 226, in this exemplary embodiment, two beams. The streams, that may be understood as data streams, may then be received using receiving antennas 218 of a terminal device that in this exemplary embodiment sin a terminal device of MIMO rank 2. The data streams 222 and 224 are then combined to obtain the data 220. In this exemplary embodiment the several streams that are transmitted using several beams have the benefit of increasing network capacity.

Figure 2C:
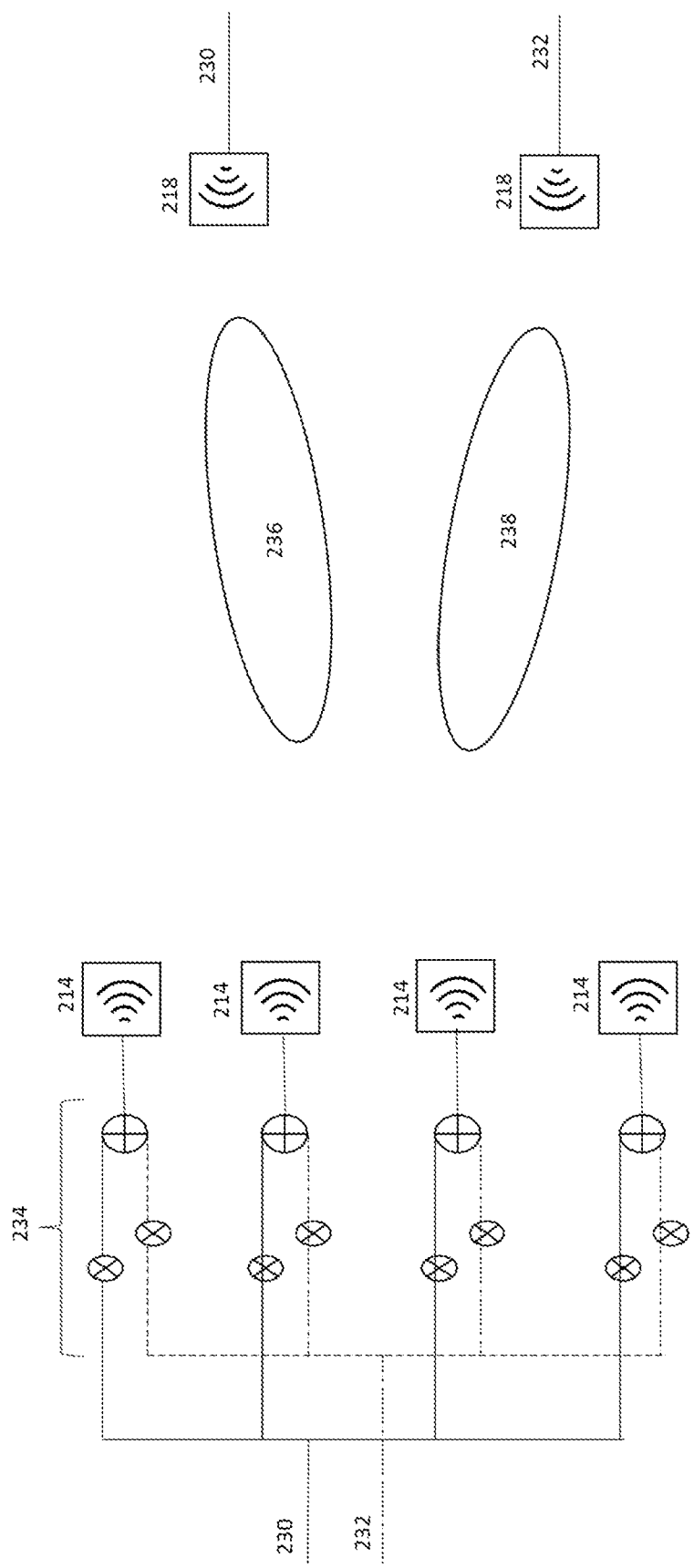
FIG. 2C illustrates an exemplary embodiment of using common hardware for both beamforming and mMIMO.

FIG. 2C illustrates an exemplary embodiment of using common hardware for both beamforming and mMIMO and this is illustrated in a high-level block diagram. In this exemplary embodiment there are two data streams, data streams 230 and 232. It is to be noted that there could also be another number of data streams. These data streams, after applying weights and multiplexing, are then transmitted using multiple transmitting antennas 214. It is to be noted that the number of antennas is to be equal or greater than the number of data streams. Beams are then used to transmit the data streams such that a first beam 236 transmits the first data stream and a second beam 238 transmits the second data stream. It is to be noted that in case there are more data streams to be transmitted, correspondingly more beams will be used for transmitting the data streams. Then, using receiving antennas 218, the first data 230 intended for a first user is received and the second data 232 intended for the second user is received.

When using phase array antennas however the antenna geometry may require a compromise to be chosen as both techniques may inherently have different spacing requirements regarding antenna arrays. For example, mMIMO may favour larger spacing between antenna elements for more antenna gain and less mutual coupling whereas beamforming may require smaller separation between antenna elements to create wide beam (envelope) for antenna sub-array in order to maximize scanning range.

Figure 3:
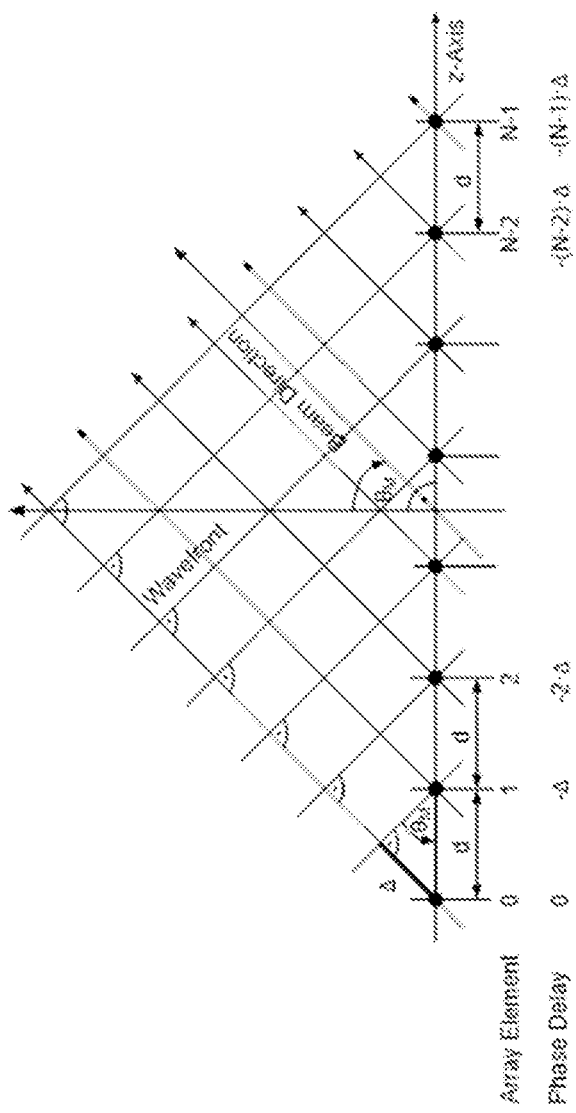
FIG. 3 illustrates an example regarding how a single column of antenna elements can be used to apply the beam in a specific direction.

FIG. 3 illustrates an example regarding how a single column of antenna elements can be used to apply the beam in a specific direction. To generate an antenna pattern with a main beam in the direction of the angle $\theta_M$ [°] a phase delay of $-n \cdot \Delta$[°] is to be applied to each array element. The index n running from 0 to (N−1) illustrates the position number of an array element and a negative sign indicates that the beam moves counter-clockwise for positive delays. Correspondingly, in a planar array the phase delays may be applied such that the main beam can be scanned both in the horizontal and in the vertical direction.

Figure 4:
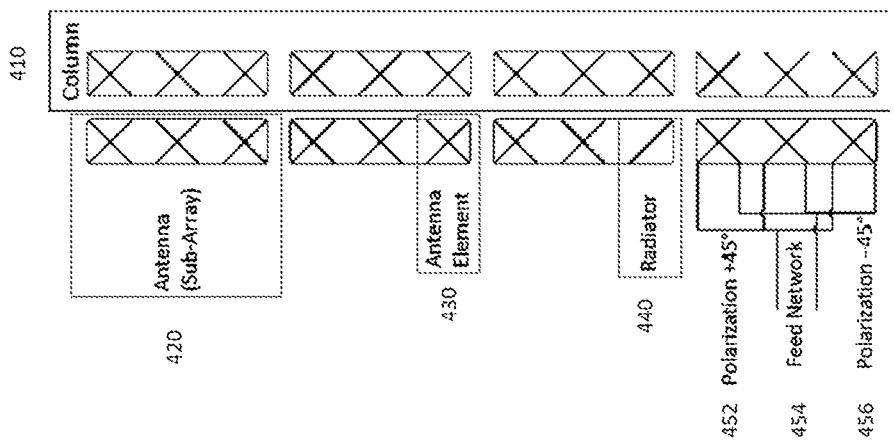
FIG. 4 illustrates an exemplary embodiment in which three antenna elements are combined to form one sub-array.

In some embodiments comprising base station applications, antennas may be designed to cover wide scanning range in azimuth and a limited range in elevation direction. Whilst the azimuth steering range may mostly remain the same, the elevation steering range may be dependent on a deployment scenario which may include dense urban environment with high rise buildings, urban environment or rural environment. These different environments introduce different requirements regarding elevation coverage and thus may require different antenna geometry. Providing different antenna geometries may however be undesirable by the vendors who prefer to use the same antenna building block for all deployment scenarios. Thus, in some exemplary embodiments, each antenna column may be divided into blocks of sub-arrays, that may be understood as antenna sub-arrays, effectively making it a single antenna unit. Although the physical separation between two adjacent antenna elements remains the same, the flexibility in choosing the number of antenna elements in one sub-array, and thus different number of sub-arrays in a column, creates degrees of freedom for the vertical coverage while maintaining the overall antenna gain. FIG. 4 illustrates an exemplary embodiment in which three antenna elements are combined to form one sub-array. In this exemplary embodiment there is illustrated an antenna column 410, an antenna array, that may be a sub-array, 420, an antenna element 430, a radiator 440 as well as polarization of +/−45 degrees 452 and 456 and feed network 456.

The number of antenna elements combined to form a sub-array, may have varying effects depending on the chosen number. On the one hand, a smaller sub-array, such as one sub-array forming one antenna element, combined with suitable spacing between them gives more degrees of freedom with better antenna characteristics. Yet, on the other hand, the cost and complexity of the product increases dramatically as the number of sub-arrays is to be increased. The cost may increase for example because every sub-array requires a separate transmit receive (TRX) chain including power amplifier, low noise amplifier, circulator, DACs, ADCs, etc. whereas the complexity may increase because more processing power is needed to compute complex weights for every TRX branch which feeds the antenna port/sub-array. To address this issue, a full digital beamforming that has a benefit of having simultaneous beams in three dimensions depending on the antenna geometry may be utilized.

Figure 5:
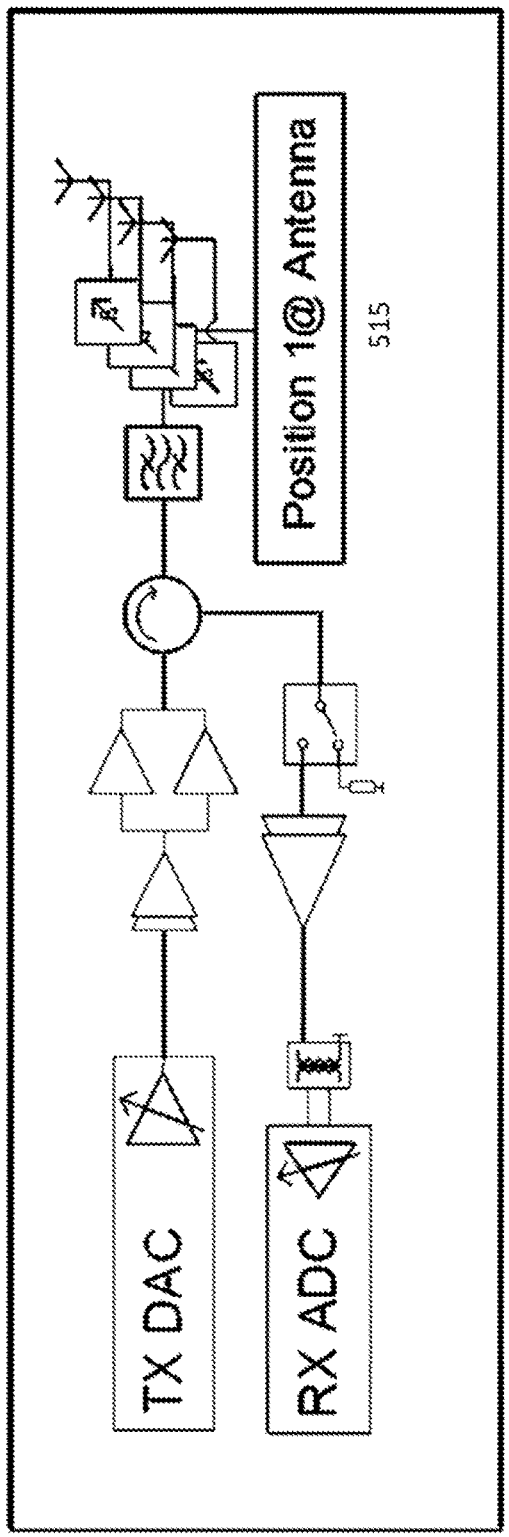
FIG. 5 illustrates exemplary embodiments of two different options regarding positioning of a phase shifter component.
Figure 5:
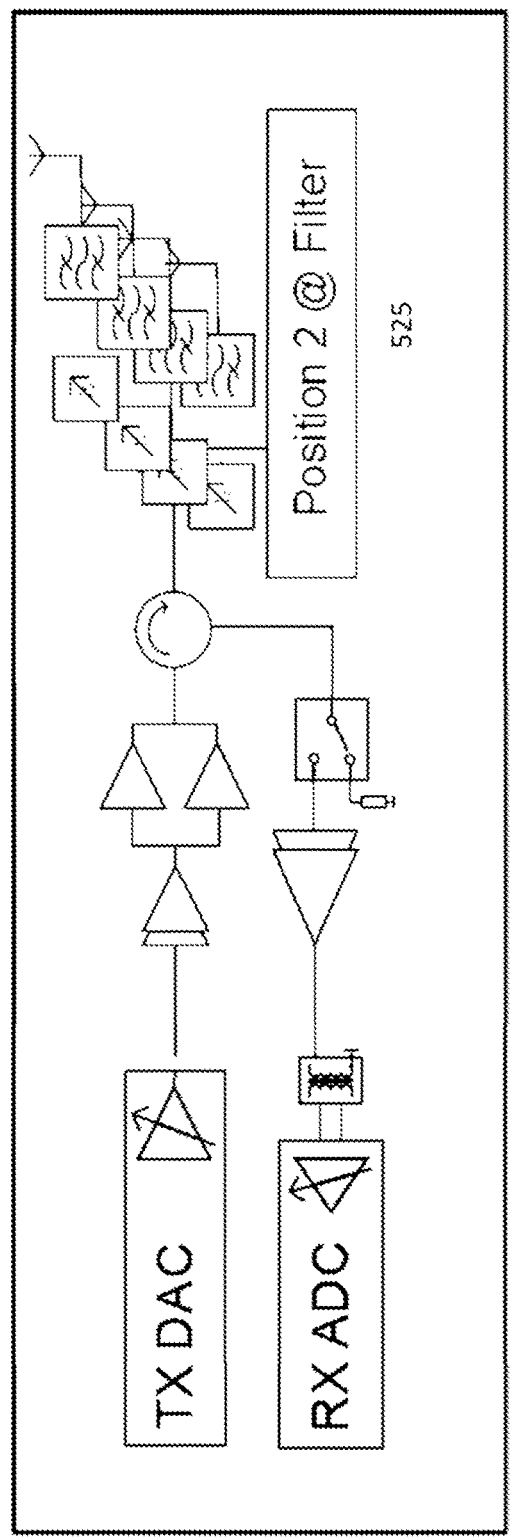

The number of TRX chains may be reduced while still having the ability to steer the beam by adding a phase shifter before selected sub-arrays, or antenna element, and by applying suitable phase shifts by controlling the phase shifters in an analogue manner. Selected sub-arrays may be understood such that a phase shifter may be placed in front of each antenna sub-array, in other words, in front of all antenna sub-arrays that are comprised in a plurality of antenna columns. The selected sub-arrays may alternatively be understood such that the phase shifters are placed in front of some pre-determined sub-arrays, that are comprised in a plurality of antenna columns, but not necessarily in front of all the antenna sub-arrays. However, in some exemplary embodiment, the phase shifters may not settle in microseconds timeframe and therefore dynamic beam steering may not possible. In order to cover a relatively larger scanning range, phase shift of >360° may be required. Additionally, an extent of cost saving due to reduced components depends on the phase shifter position in the whole RF chain. FIG. 5 illustrates exemplary embodiments of two different options regarding positioning of a phase shifter component. In FIG. 5 there are two exemplary embodiments of an RF front end, RF front end 510 and RF front end 520. In RF front end 510 the phase shifter 515 is positioned directly before an antenna port. This solution is feasible if the phase shifter is capable of fulfilling stringent requirements on aspects such as on linearity and power handling. This solution is also suitable when static beam steering is required instead of dynamic beam steering. Another solution is then introduced in the exemplary embodiment of an RF front end 520. In this exemplary embodiment a phase shifter 525 is placed just before a filter.

With hybrid beamforming architecture, beamforming in digital domain may be combined together with beamforming in analogue RF domain at an antenna to minimize cost and also to maximize beamforming capabilities and mMIMO active antenna system (AAS) performance. When observing the environments in which users of wireless communication systems such as cellular communication networks are located, FIG. 6 provides an exemplary graph that illustrates cumulative distributive function (CDF) of the elevation angle of users. The observed spread of users in urban macro (Uma) and urban micro (Umi) scenarios is often much more in horizontal direction as compared to the vertical direction. Additionally, as illustrated in the exemplary graph, a large percentage of users in the vertical direction are confined in particular scanning range. The graph shows that −85% users have an elevation direction between 0° to −10° with an average value of −6.2°. Therefore, it makes sense to reduce the cost and complexity when focusing on the elevation direction using an optimized beam with a beamwidth that enables to serve most of the users as compared to horizontal direction. The rest of the users in elevation domain may then be served in a dynamic beam steering fashion.

FIG. 7 illustrates an exemplary embodiment of an RF front end 710 that comprises 16 transmitters and 16 receivers, a 16TX16RX product, with phase shifters that enable hybrid beamforming. In this exemplary embodiment, the phase shifters 715 may be placed just before antenna or before antenna and filter, as shown in the FIG. 7, which then enables dynamic steering of beam in vertical direction and thus enabling hybrid beamforming, which is understood as a combination of beamforming in the digital and analogue domain. Thus, the hybrid beamforming may enable for example beamforming in the elevation in analogue RF domain and in the horizontal in the digital domain or vice versa. It is to be noted that the concept introduced in this exemplary embodiment may also be extended to AAS that requires a greater number of TRXs such as 32T32R, 64T64R, 128T128R, depending on the requirements such as coverage, capacity, and power consumption for a frequency range of interest in FR1. The higher the frequency, the more antenna gain may be required to compensate for path losses in order to obtain a reasonable coverage, and more antenna gain may require more antenna elements and a greater number of TRXs. With increasing of frequency, the benefit of having a hybrid beamforming in FR1 may become more obvious.

If one elevation angle is to be scheduled for a given slot because of the constraint of analogue beamforming in elevation, a scheduler algorithm may be optimized accordingly. Thus, the scheduler algorithm may be enhanced such that system-level performance does not degrade despite the constraint that a single elevation beams is to be scheduled in a slot. Such enhancements to the scheduler algorithm may use knowledge regarding the amount of traffic on each of the elevation beams for selecting the beam to be scheduled in a slot. The beam and users for scheduling in a slot may be selected such that the right balance between resource utilization and beamforming gain is achieved to improve the system-level performance.

Figure 8:
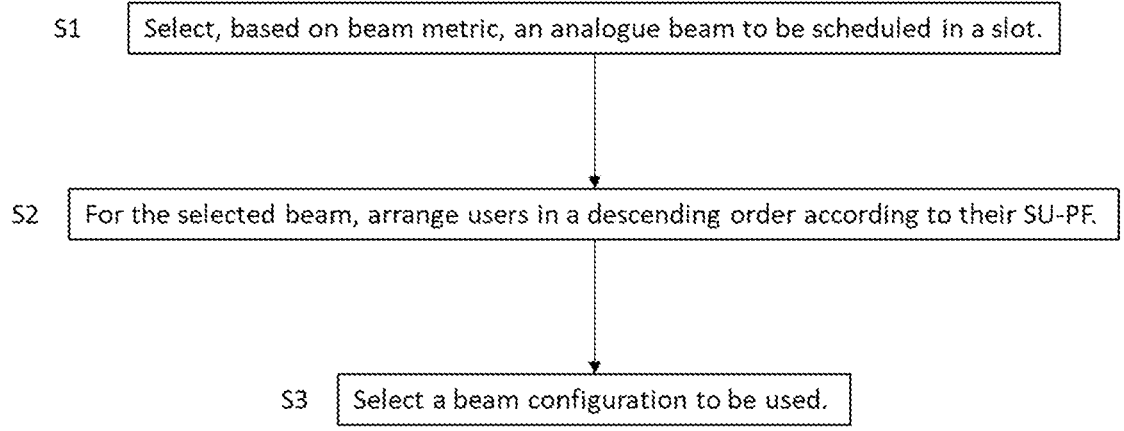
FIG. 8 illustrates a flow chart according to an exemplary embodiment.

FIG. 8 illustrates a flow chart according to an exemplary embodiment of an enhanced the scheduling algorithm for the hybrid beamforming (HBF) solution. First, in S1, based on beam metric, an analogue beam to be scheduled in a slot is selected. The analogue beam is thus a beam that has been selected and may also be referred to as a selected beam. In this exemplary embodiment, the beam metric is used for the selection instead of a user metric to select a single analogue beam to be scheduled in a slot. The beam metric may be defined as the weighted sum of user PF (Proportional Fair) metrics, where the weights are the estimated PRB requirement of the eligible users. In other words, the beam metric may be defined as a weighted sum of scheduler metrics, associated with terminal devices and wherein weights reflect a required number of physical resource blocks for the terminal devices. Further, the beam metric may be computed as a first priority, by considering users for whom the current beam is their best beam, and, as a second priority, by considering users that do not consider the current beam as its best beam. It is to be noted that if a user considers a beam to be the best or not to be the best beam, it may also be understood as the user, which may be a terminal device, to determine that the beam is the best or is not the best beam for it. The beam metric computation may be stopped when either there are no more users are eligible for scheduling or we exhaust RBs available for scheduling. Then, the beam with the largest beam metric is selected, in this exemplary embodiment, for scheduling in the slot. It is to be noted that the users may be understood as terminal devices receiving data.

Next, in S2, for the selected beam, users are arranged users in a descending order according to their Single user PF (SU-PF) metric. It is to be noted that alternatively, or additionally, also other metrics could be used such as spectral efficiency or delay-based metrics. In other words, after selecting the beam in S1, users that consider the selected beam as their best beam are arranged in descending order of their SU-PF and physical resource blocks (PRBs) are first allocated to users that consider the selected beam as their best beam. After PRBs are allocated to these users and if some PRBs are left unutilized, then other users that do not consider the selected beam as their best beam are allocated PRBs in descending order of their spectral efficiency on the current beam. It may also be that only those users, for whom the reduction in the spectral efficiency to the current beam is lower than a threshold, are considered for scheduling in the current beam. It is also to be noted that additionally or alternatively, the unutilized PRBs may also be allocated to the other users, for whom the beam is not considered as their best beam, based on other metrics such as delay-based metric or PF metric. A descending order may then also be applied.

Finally, in S3, the beam configuration to be used in selected. For example, based on user traffic and load distribution, either a broad beam along with other narrow beams or a beam configuration with all narrow beams or a mechanism to adaptively or statically choose the beam configuration may be used.

Figure 9:
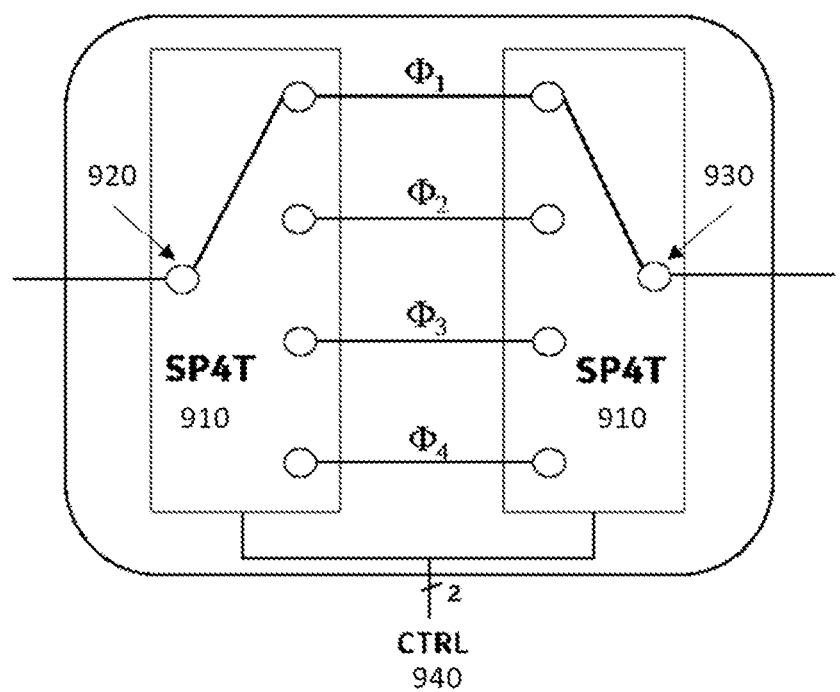
FIG. 9 illustrates an exemplary embodiment of a phase shifter.

In a hybrid beamforming architecture described in the exemplary embodiments herein, the phase shifters are to fulfil requirements such as high linearity, high power handling and ability to provide a wide range of phase shifts. Additionally, the required phase shifts for a wider steering range exceeds 360° phase shift which may also be a requirement for the phase shifters. Therefore, phase shifting based on time delay by adding delay lines between two cascaded switches utilized. FIG. 9 illustrates an exemplary embodiment of a phase shifter. In this exemplary embodiment, the phase shifter comprises two SP4T switches 910 and delay lines with input 920, output 930 and a 2-bit control (CTRL) pin 940. It is to be noted though that although the phase shifters in this exemplary embodiment are high power SP4T switches, the phase shifter could be also SPxT switches, in other words, the delays lines in this exemplary embodiment achieve 4 different phase shifts, but in some other exemplary embodiments, another number, that is x, of different phase shifts. The length of the different delay lines may be dependent on the antenna geometry and the layout. The switches, and therefore the beam direction, may be steered from the digital domain by beamforming commands. The beamer functionality may be responsible to steer the beam into the right direction and calculates the right settings for the analogue switch and the digital beamforming weights.

Figure 10:
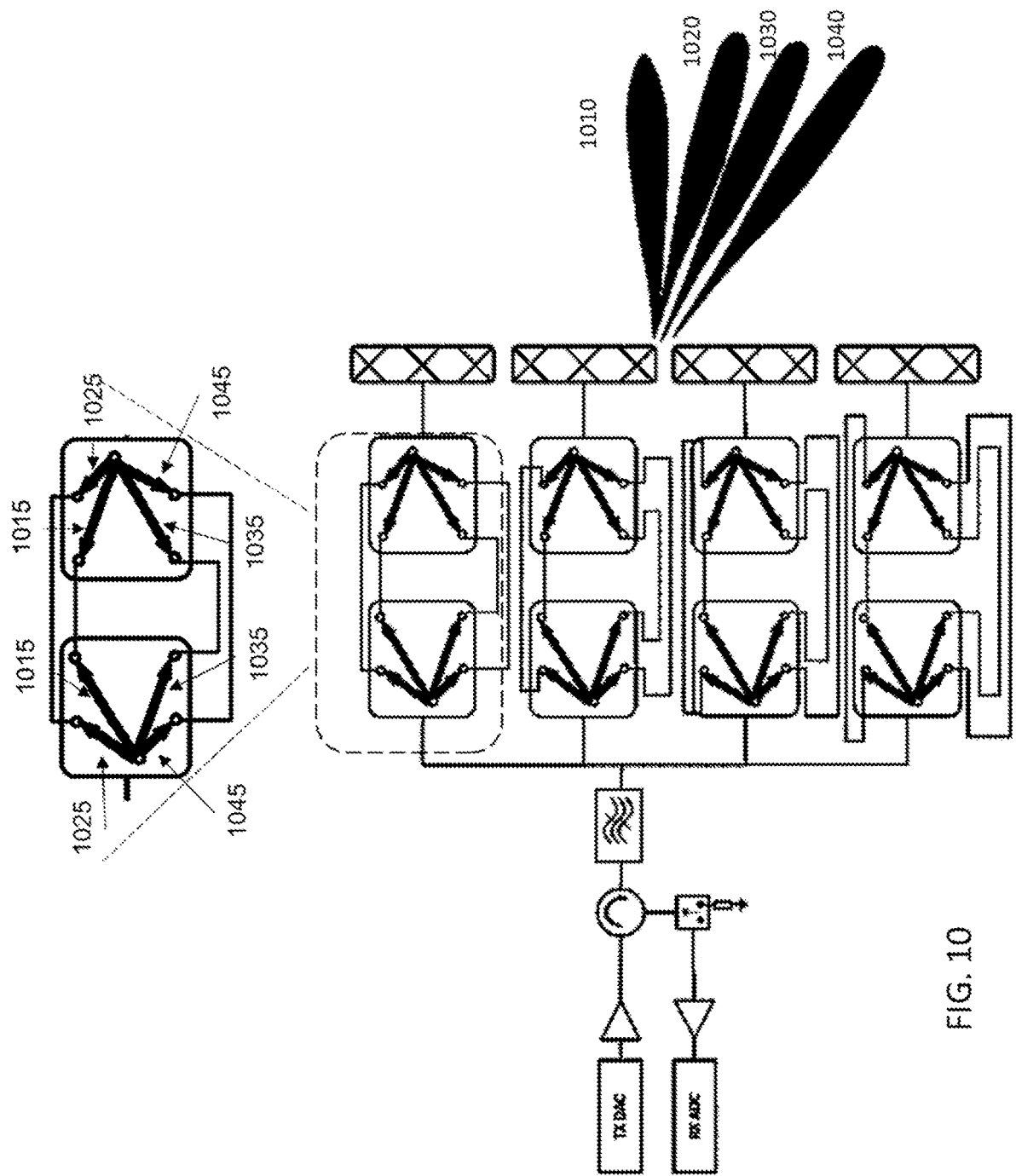
FIG. 10 illustrates an exemplary embodiment of a graphical representation of usage of SP4T based phase shifter for tilting a beam in a vertical direction using one antenna column.

FIG. 10 illustrates an exemplary embodiment of a graphical representation of usage of SP4T based phase shifter for tilting a beam in a vertical direction using one antenna column. Beam 1010 is obtained when lines 1015 of the phase shifters are connected, beam 1020, when the lines 1025 are connected, beam 1030 when lines 1035 are connected and beam 1040 when lines 1045 are connected. The bigger the difference between the phases of array elements the more steered the beam is in vertical direction in this exemplary embodiment.

Figure 11:
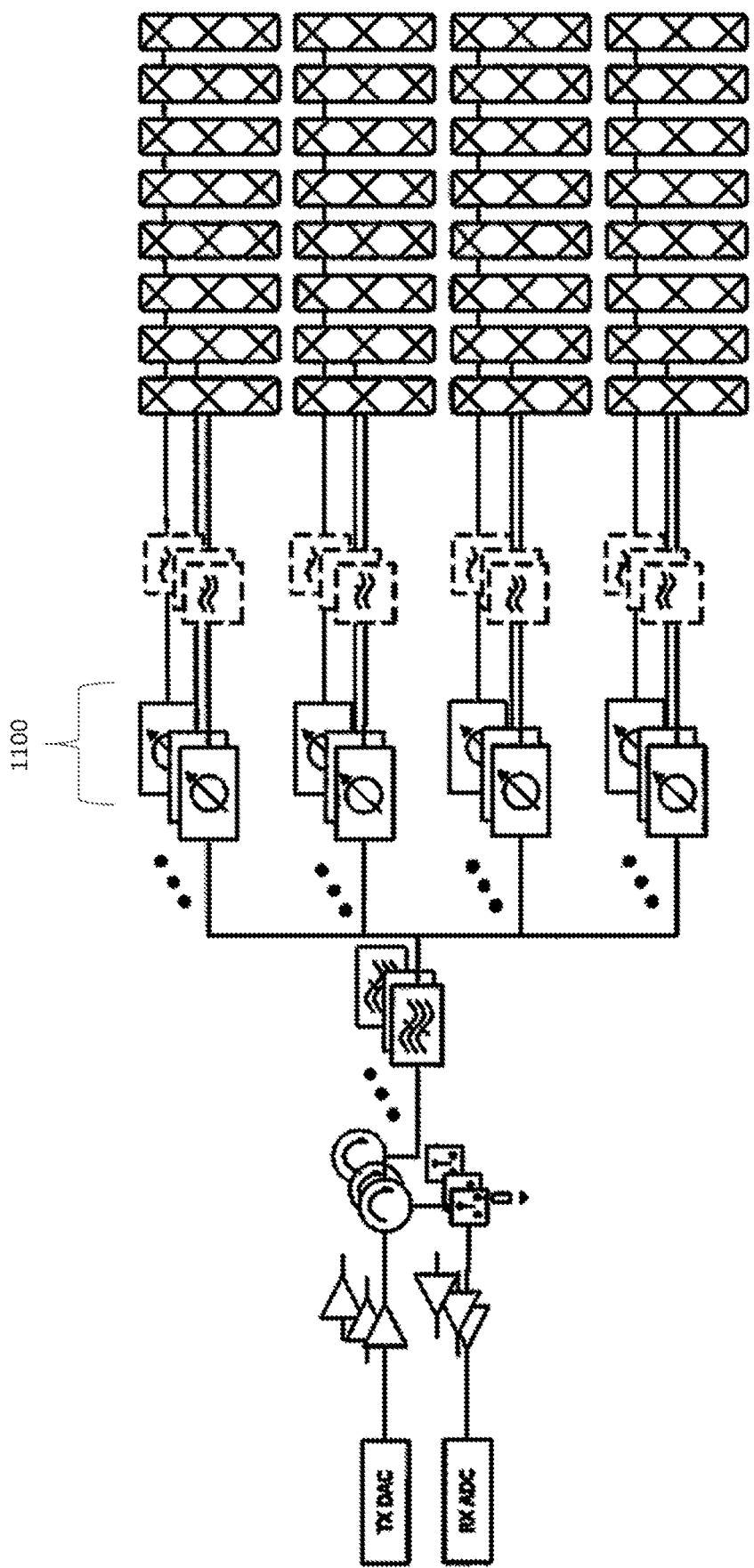
FIG. 11 illustrates an exemplary embodiment of 16TX16RX version with phase shifters and optional low pass filters.

The requirements for a high power SP4T switch may include for example a maximum insertion loss of up to 0.4 dB for a single switch, 37 dBm RMS and 45 dBm peak input power handling, Out Intercept Point 3 (OIP3) of up to 85 dBm and a switching time of up to 1 µs. Silicon on Insulator (SOI) technology is feasible for such application and a SOI based SP4T switch can be realized and utilized in the hybrid beamforming architecture. It is to be noted that such SOI switches may be realized by semiconductor vendors and have indeed been thoroughly evaluated already and are expected to be available commercially as well. In case of strict regional Out of Band (OOB) emission requirements an optional low pass filter 1100 can be added after the phase shifter to suppress the harmonics, as shown in FIG. 11, in which an exemplary embodiment of 16TX16RX version with phase shifters and the optional low pass filters 1100 for suppressing harmonics is illustrated.

It is to be noted that with a hybrid beamforming architecture, such as those described in the exemplary embodiments, a switching event is to be placed during live transmission and reception and it should be placed such that the system level performance remains acceptable. For example, the 3GPP defined frame structure for 5G new radio (NR) physical layer structure for frequency range (FR) 1 mentions different numerologies including 15 kHz, 30 kHz, and 60 kHz subcarrier spacing (SCS). The duration of a slot differs for different numerology with minimum duration for 60 kHz SCS. Every slot with 60 kHz SCS has 14 symbols each having a cyclic prefix. The switching time of the switch used in the phase shifter is thus to be chosen such that its duration is less than the duration of the shortest cyclic prefix standardised for FR1 frequency range. Cyclic prefix may comprise redundant information to prevent the effect of inter symbol interference being considered when processing FFT samples. Therefore, the switching event may be triggered at the start of the cyclic prefix of the first symbol of the slot when the beam switching is desired. This allows it have a minimum effect on the system performance and also enables dynamic vertical beam steering on a per slot basis. It is to be noted that a switching event may be understood to comprise produce a chosen beam configuration by providing a beamforming command and using a control line controlling a switch network comprised in phase shifters to steer the beam. Thus, the switching event may be understood as an occurrence of changing the configuration of the beam and the switching event may be triggered using the beamforming command, that may be obtained using one or more software algorithms, and the beamforming command may cause switches to change the configuration of the beam that is produced using hardware.

Figure 12A:
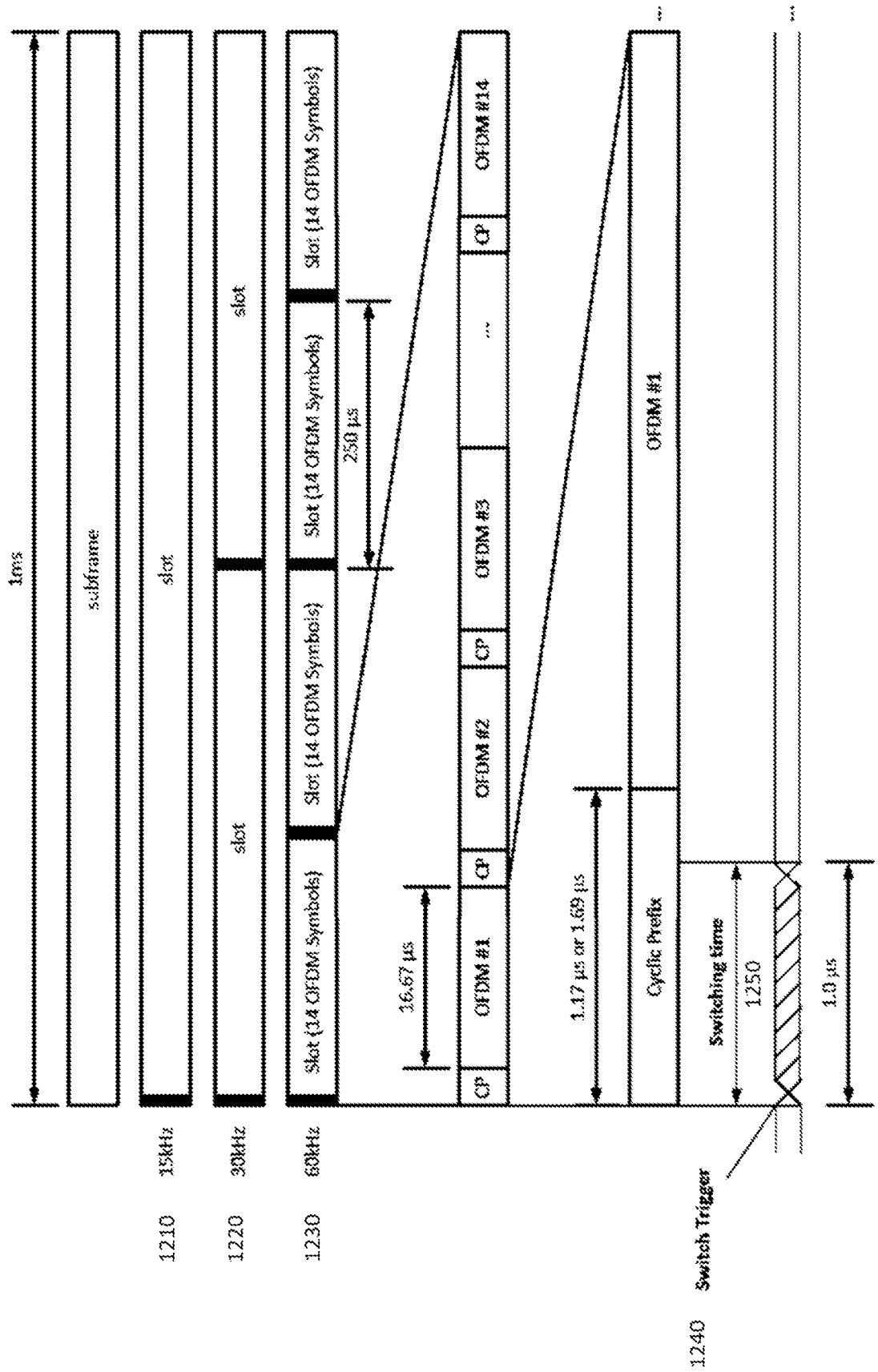
FIG. 12A illustrates an example of 5G NR subframe structure with different numerologies.
Figure 12B:
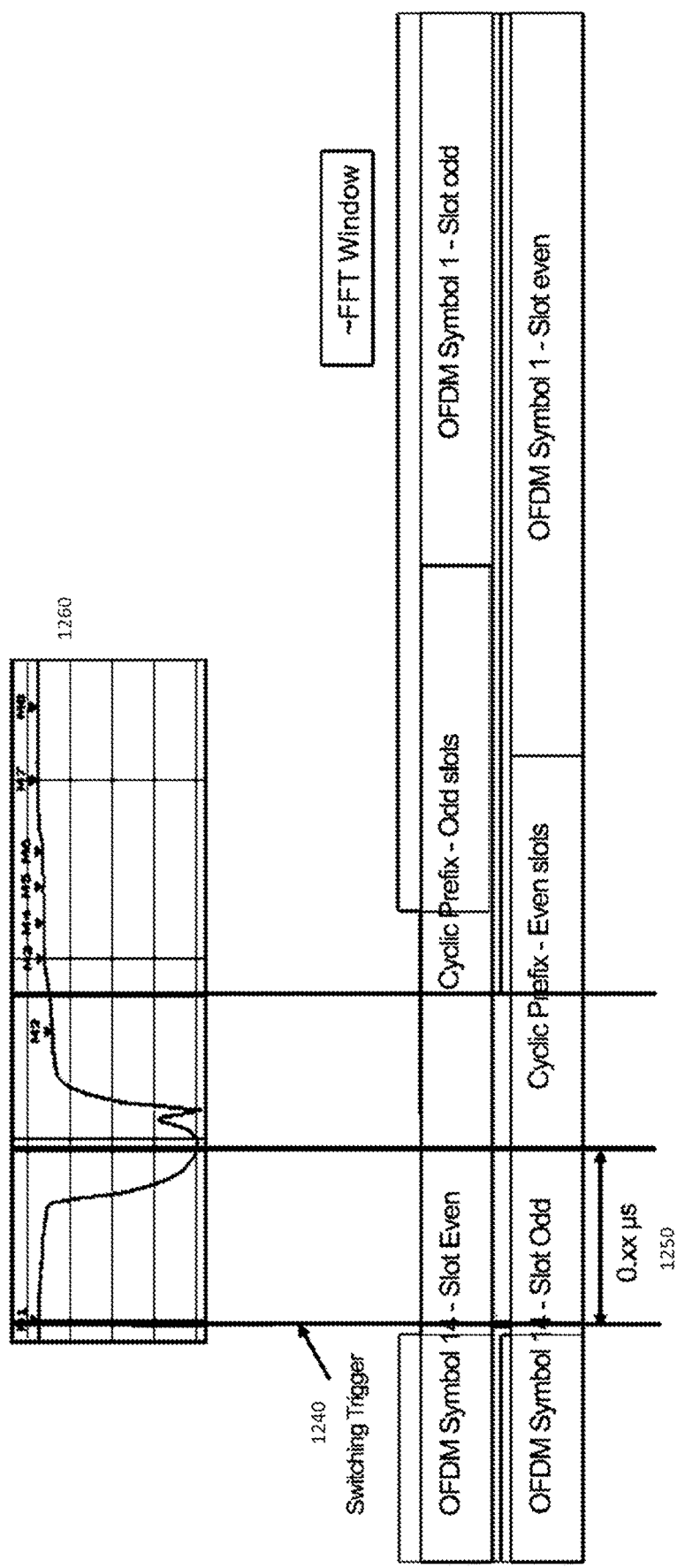
FIG. 12B illustrates an example in which a switching trigger occurs prior to a start of a slot for which a trigger event is determined.

FIG. 12A illustrates an example of 5G NR subframe structure with different numerologies. In this example there is numerology 15 kHz SCS illustrated as 1210, numerology 30 kHz SCS illustrated as 1220 and numerology 60 kHz SCS illustrated as 1210. In the FIG. 12, the placement of the switching event is illustrated such that the switching trigger 1240 triggers the event at the beginning of a first symbol of a slot when beam steering is to occur. The switching time 1250 is to have a duration that is less than the shortest cyclic prefix, which in this example is to be expected from 60 kHZ SCS with a duration of 1.17 or 1.69 microseconds. Switching time may be understood as the time it takes to switch from the current beam configuration to the beam configuration that is chosen and then settle to the chosen beam configuration. FIG. 12B illustrates another example in which the switching trigger 1240 occurs prior to the start of the slot for which the trigger event is determined. This may be beneficial as can be seen from the graph 1260. It is to be noted that a switching event can also occur, that is, to be triggered, multiple times during the slot which it is to benefit. Also, the switching event may occur with a start of the symbol of the slot and the symbol may be the first symbol or another symbol within the slot.

In a hybrid beamforming architecture, such as described in the exemplary embodiments, the switch control mechanism may comprise a 2-bit parallel control line that enables four different switch states. All switches, which together form a switch network, may be controlled by this control line and may be switched between different states simultaneously. FIG. 13 illustrates an exemplary embodiment of such a switch network that comprises switches 1315 that are controlled by the 2-bit control line 1310. In FIG. 13, there is magnified a switch pair for the purpose of illustrating how the 2-bit control line can be used to control the states of the switches. In this exemplary embodiment the switch network is with the control lines 1310 for a single column of a planar array and the control lines are connected to each other and every switch in all columns using the same principle. As there are no individual controls over a single switch or a group of switches, complexity may be minimized both from software and hardware design perspective in this exemplary embodiment.

As soon as a scheduler determines an optimum beam with a unique identification number from the available set of beams, the control bits associated with that unique identification number are fetched from a look up table and the beam switching event is triggered synchronously with the start of the first symbol of the relevant slot. Additionally, adjustments that may be understood as fine adjustments, may also be done. Examples of such adjustments include advanced or delayed switching events with reference to a start of a relevant slot in order to optimize the performance level required.

Hybrid beamforming (HBF) architecture along with enhanced scheduling algorithm may have performance between that of 16 TRX digital solution and the 64 TRX digital solution based on the user distribution, traffic load, and volume of traffic backlogged for each of the users. Users may also be understood as terminal devices receiving or transmitting data. Also, the HBF architecture along with the enhanced scheduling algorithm, such as described in the exemplary embodiments, may be used with a 32T32R solution to achieve a 64T64R like performance.

A scheduling algorithm may select users in descending order of the user proportional fair (PF) metric. However, the constraint with hybrid beamforming architecture of scheduling a single elevation beam in a slot means that the beam selection should be done optimally to achieve good system performance. The scheduling improvements introduced below have benefits such as not increasing computational complexity significantly and achieving performance that is significantly better than for example a 32 TRX solution. As such, the following improvements, when used together, may achieve a significant performance gain over a baseline solution and make the HBF solution achieve performance that is better than the fully digital beamforming solution with twice the number of TRXs or a fully digital system with fixed down-tilt.

To achieve these improvements, knowledge of how much traffic there is in each of the beams is utilized before deciding the beam to schedule in elevation. With digital beamforming, the terminal devices may be blindly scheduled based on their metrics, because different beams can be multiplexed in the frequency domain. With HBF, it is to be taken into account that the chosen beam may be the only one that is scheduled in this slot. Therefore, it is to be determined which other terminal devices are to be scheduled with this choice of beam. Next, terminal device may be scheduled based on their second-best beams, third-best beams, etc. in such a manner that the terminal devices that have the least drop in their spectral efficiency are selected. This may also alleviate the analogue beamforming constraint. Finally, wide beams in elevation may be utilized when it is determined that there is small traffic widely distribute in the elevation direction such that more terminal devices may be scheduled rather than having to distribute them in time. It is to be noted that a beam may be considered as wide if it has a width above a threshold value. If the width is below the threshold value, then the beam may be considered as narrow.

In exemplary embodiments in which only one beam can be scheduled in a slot, it is the beam is to be selected such that the best performance from amongst the available elevation beams may be achieved. For example, a terminal device may be determined to be on beam j, or equivalently, beam j is said to be the best beam for the terminal device, when beam j has the highest correlation with the channel of the terminal device amongst all the available beams I (i.e., j=arg max$_i$||HW$_i$||$^2$). For the purposes of beam metric computation, the set of eligible terminal devices in a slot may be classified into two sets—the first set (N$_j$) may include users associated with beam j and the second set ($\overline{N}_j$) may be the set of terminal devices that do not consider beam j as their best beam. For beam selection, a beam metric that is a weighted sum of PF metric from first set of users (N$_j$), where the weights are the estimated PRB requirement of the terminal devices, may be utilized. In other words, beam metric can be defined by weights that are used to reflect a required number of PRBs for the associated user, that is, for the target terminal device. Terminal devices in the set N$_j$ may be arranged in descending order of their SU-PF metrics. Terminal devices in set $\overline{N}_j$ may be sorted in decreasing order of their spectral efficiencies in beam j, and such terminal devices in set $\overline{N}_j$ may be considered eligible, whose spectral efficiency drop from their best beam to beam j is smaller than a threshold. This prevents terminal devices for which the spectral efficiency drops from their own best beam to beam j are too large, that is above a threshold amount, from being considered for scheduling in beam j, and hence do not contribute to the beam metric of beam j. Such terminal devices that may together, at least substantially, fully make use of available bandwidth contribute to the beam PF computation. Beam metric for Beam j (B$_j$) is computed as follows:

$$B_j = \sum_{i=1, u_i \in N_j}^{x} \text{RB\_Req}_{ij} * PF_{ij} + \left( RB_{available} - \sum_{u_i \in N_j, i=1}^{x} \text{RB\_Req}_{ij} \right) PF_{(x+1)j}$$

Where x is such that $\Sigma_{u_i \in N_j, i=1}^{x} \text{RB\_Req}_{ij} \leq RB_{available} < \Sigma_{u_i \in N_j, i=1}^{x+1} \text{RB\_Req}_{ij}$ $B_{j_2}=0$, if x users are able to use all the available RBs else
$B_{j_2}$ $$= \sum_{i=1, u_i \in \overline{N}_j}^{y} RB_{Req_{ij}} * PF_{ij} +$$

$$\left( RB_{available} - \sum_{u_i \in N_j} RB_{Req_{ij}} - \sum_{u_i \in \overline{N}_j, i=1}^{y} RB_{Req_{ij}} \right) PF_{(y+1)j}$$

Where y is such that $$\left( \sum_{u_i \in N_j} RB_{Req_{ij}} + \sum_{u_i \in \overline{N}_j, i=1}^{y} RB_{Req_{ij}} \right) \leq$$

$$RB_{available} < \left( \sum_{u_i \in N_j} RB_{Req_{ij}} + \sum_{u_i \in \overline{N}_j, i=1}^{y+1} \text{RB\_Req}_{ij} \right)$$

In this exemplary embodiment, beam metric B$_j$ is the beam metric contribution by the terminal devices in set N$_j$.

RB_Req$_{ij}$ is the estimate of PRB requirement of terminal device u$_i$ from set N$_j$ if scheduled in this slot on beam j. x is the number of terminal devices from set N$_j$ such that sum RB_Req$_{ij}$ is less than or equal to RB$_{available}$, but adding the next terminal device u$_{(x+1)}$ results in exceeding the available PRBs RB$_{available}$. For both sets of terminal devices the required number of PRBs may be determined, for example, from the modulation and coding scheme (MCS) estimated using wideband channel quality indicator (CQI) along with outer loop link adaptation (OLLA) correction. Optionally, if the beam configuration includes all narrow beams instead of utilizing a wide beam, the beam metric may be computed, which may also be understood as determined, using only users from set N$_j$.

Based on the computed beam metric of the available analogue beams in the elevation domain, the scheduler may select the beam with the largest beam metric for scheduling in the slot. Following beam selection, terminal devices may be selected for scheduling first from the terminal devices in set N$_j$ followed by the terminal devices in set $\overline{N}_j$. Terminal devices from set $\overline{N}_j$ may be allocated resources if there are unutilized PRBs after allocating resources to all eligible terminal devices in set N$_j$ to drain out all the data in their buffers. Terminal devices in set N$_j$ are arranged in descending order of their SU-PF metric values, and are allocated resources based on their rank and wideband or sub-band CQI value along with OLLA correction. Terminal devices in set $\overline{N}_j$, on the other hand, may be scheduled and allocated resources in the descending order of their spectral efficiencies (SE) on the selected beam to allow users with a better SE in beam j to be scheduled ahead of other terminal devices. Further, these terminal devices may be allocated adequate amounts of resources based on their rank and their wideband or sub-band CQI value in the selected beam along with any OLLA correction. Terminal devices in set $\overline{N}_j$ may be allocated resources if their relative SE on the selected beam is more than a threshold when compared to its SE in its own best beam.

Figure 14B:
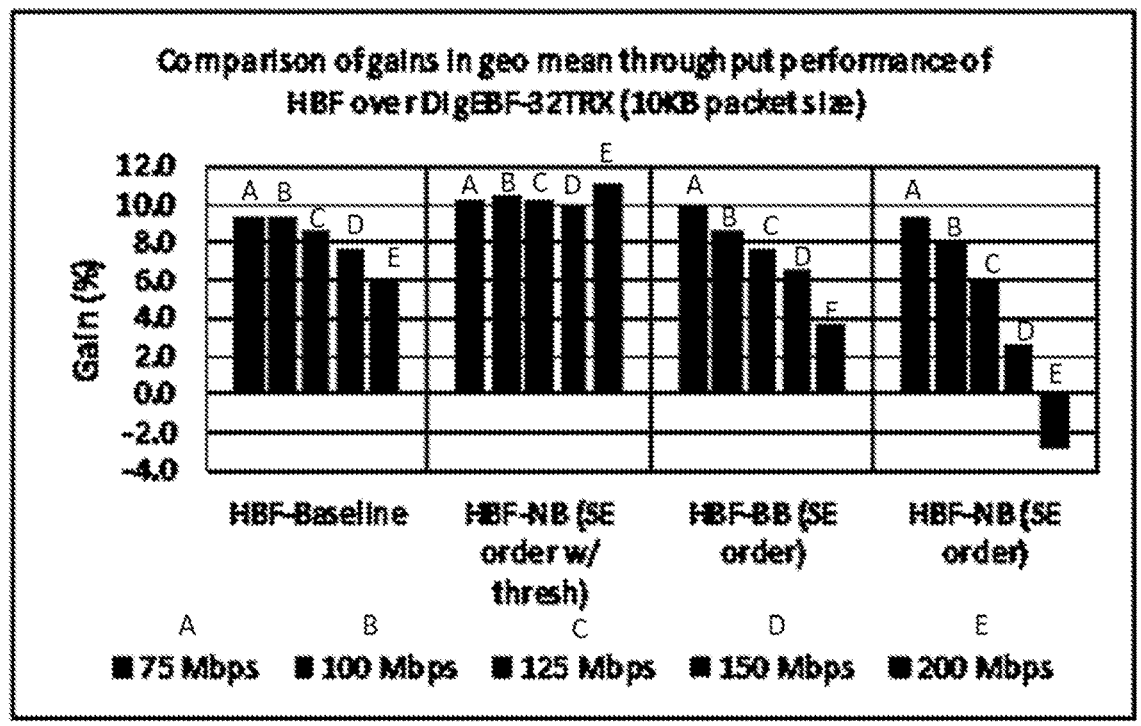
Figure 14C:
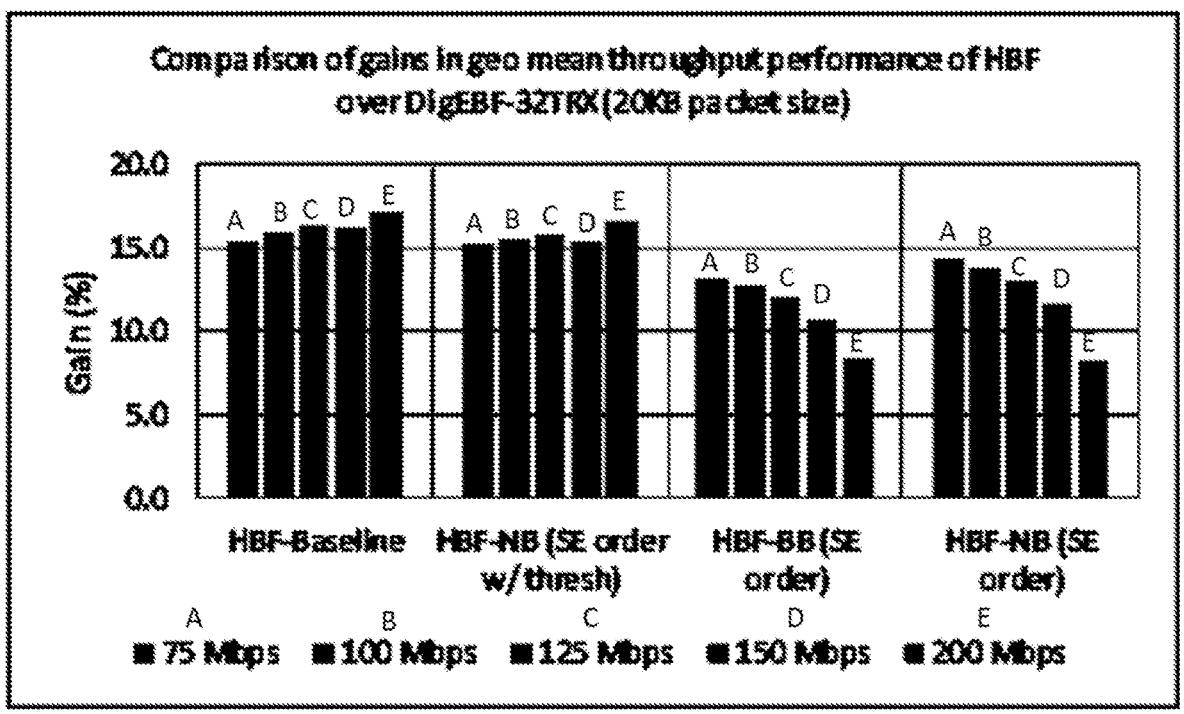

FIG. 14A, FIG. 14B and FIG. 14C are graphics that illustrate comparisons of gain in geometric mean of user throughputs of HBF solutions according to the above-described exemplary embodiments against Digital EBF (DigEBF-32) with 32 TRX for 5 KB, 10 KB and 20 KB packet sizes respectively. Simulations were performed for varying loads ranging from 75 Mbps to 200 Mbps. In the graphs of FIG. 14A a packet size of 5 kB was used, in the graph of FIG. 14B a packet size of 10 kB was used and in the graph of FIG. 14C a packet size of 20 kB was used.

From the graph of FIG. 14A it can be observed that the best performing HBF scheduling algorithm provides gains over DigEBF-32 for 5 KB packet sizes, in contrast to HBF-baseline that results in up to a 14% loss in performance. HBF-baseline in this comparison applies the single beam scheduling constraint but otherwise uses a standard state-of-the-art scheduling algorithm. For smaller packet sizes, such as, 5 KB packet size and lower offered loads, HBF-BB (SE order) outperforms HBF-NB (SE order w/thresh) because of its ability to schedule a larger number of users spread widely across the elevation domain by using the broad beam in elevation. The need for a broad beam may be more in this scenario in which there are users with small packets spread out in the elevation. However, with increase in offered loads, HBF-NB (SE order w/thresh) does better than HBF-BB (SE order) because of the higher beamforming gain when compared to scheduling using a broad beam.

From the graphs of FIGS. 14B and 14C is can be observed that the HBF scheduling algorithm and baseline algorithms provide a similar performance for larger packet sizes, such as, 20 KB across different offered loads because of higher beamforming gain and capability to steer the analog beams when compared to DigEBF-32 where narrow beams with higher beamforming gain cannot be formed in the elevation domain due to limited degrees of freedom in the elevation domain.

Comparison of gains of the best performing variants of the HBF algorithm against DigEBF-32 TRX are also summarized in Table 1 below.

TABLE 1

| Beam design | Beam selection metric | Ordering of uEs for Beam selection metric | Eligible uEs for scheduling | Scheduling order for eligible uEs |
|---|---|---|---|---|
| 4 narrow beams HBF-Baseline | Each of the narrow beams has ~25% of users associated with it | Own beam best-PF UE is used as the beam selection metric | PF order for own beam | All own beam uEs | Own beam uEs in PF order |
| 1 broad beam + 3 narrow beams (SE order) HBF-BB (SE order) | Each of the narrow beams has ~33% of the users associated. Broad beam encompasses all 3 narrow beams | All uEs | PF order for own beam, SE order for other beam uEs | All uEs | First own beam uEs in PF order, SE order for other beam uEs |
| 4 narrow beams (SE order, All uEs) HBF-NB (SE order) | Each of the narrow beams has ~25% of users associated with it | All uEs | PF order for own beam, SE order for other beam uEs | All uEs | First own beam uEs in PF order, SE order for other beam uEs |

TABLE 1-continued

| Beam design | Beam selection metric | Ordering of uEs for Beam selection metric | Eligible uEs for scheduling | Scheduling order for eligible uEs |
|---|---|---|---|---|
| 4 narrow beams (SE order, only uEs with drop in SE less than threshold) HBF-NB (SE order w/thresh) | Each of the narrow beams has ~25% of users associated with it | Own beam uEs | PF order for own beam | All own beam uEs, only a subset of other beam uEs with drop in SE less than a threshold | First own beam uEs in PF order, SE order for other beam uEs |

Figure 15:
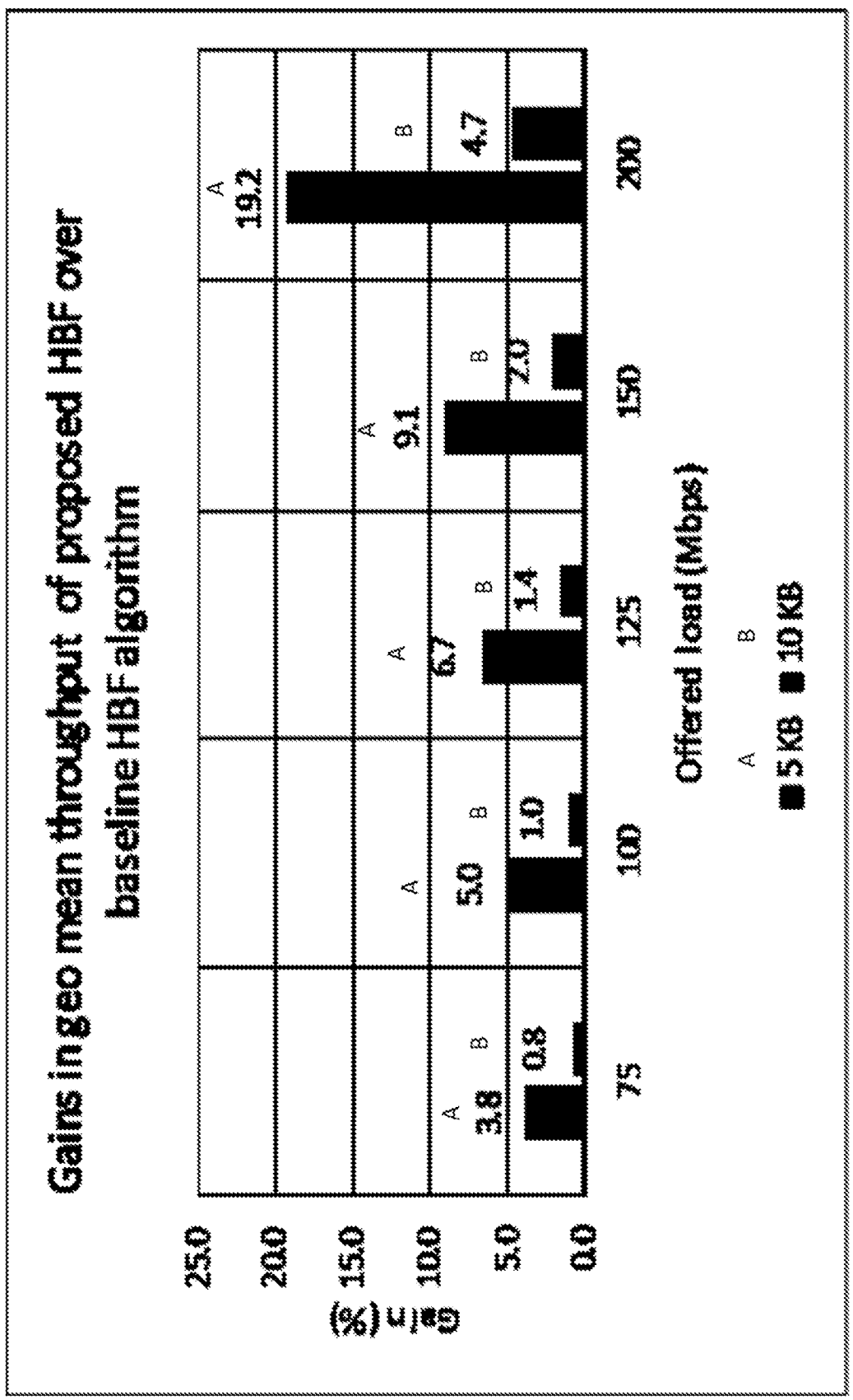
FIG. 15 illustrates a graph which compares the geo mean throughput performance of the best performing algorithm for hybrid beamforming according to exemplary embodiments.

FIG. 15 illustrates a graph which compares the geo mean throughput performance of the best performing algorithm for HBF according to the exemplary embodiments described above over the HBF-baseline. From the graph, it may be observed that the primary gains of using the proposed algorithm are for smaller packet sizes, such as, 5 KB packets. With smaller packets, there may be a larger spread of users in the elevation. The baseline HBF scheduling/beamforming algorithm may not directly take into account the single beam scheduling constraint with HBF that limits the set of users that can be scheduled even when resources are available. On the other hand, the exemplary embodiments described above take this constraint into account and intelligently select the beam to be scheduled, and may also schedule terminal devices in other elevation beams in an intelligent fashion by selecting terminal devices with high spectral efficiencies and limiting the scheduling to those terminal devices with a small-enough relative drop in spectral efficiency For scenarios in which multiple terminal devices are transmitting small packets, for example, short chat messages using messengers, such as, Whatsapp, there may not be many active/eligible users with data available for scheduling in one beam resulting in underutilization of the available bandwidth. Therefore, for these scenarios, the exemplary embodiments described above may switch to a broad beam from a narrow. Using a broad beam with cell-wide coverage allows scheduling of more users in case bandwidth is left unutilized if a narrow beam is scheduled instead. The decision to switch between broad and narrow beams may be based on user load and packet size distribution. For example, the following strategies may be adopted to realize good performance: Adaptively choose between three narrow beams and one broad beam versus four narrow beams based on load and packet size distributions. For example, if the number of allowed settings of the switch is more than four. Alternatively, a static setting of three narrow beams and broad beam versus four narrow beams based on observed long-term load and packet size distributions may be chose. Further, the HBF Narrow Beams (SE order w/thresh), which seems to provide the best performance over a large range load and packet size distributions, may be chosen.

Figure 16:
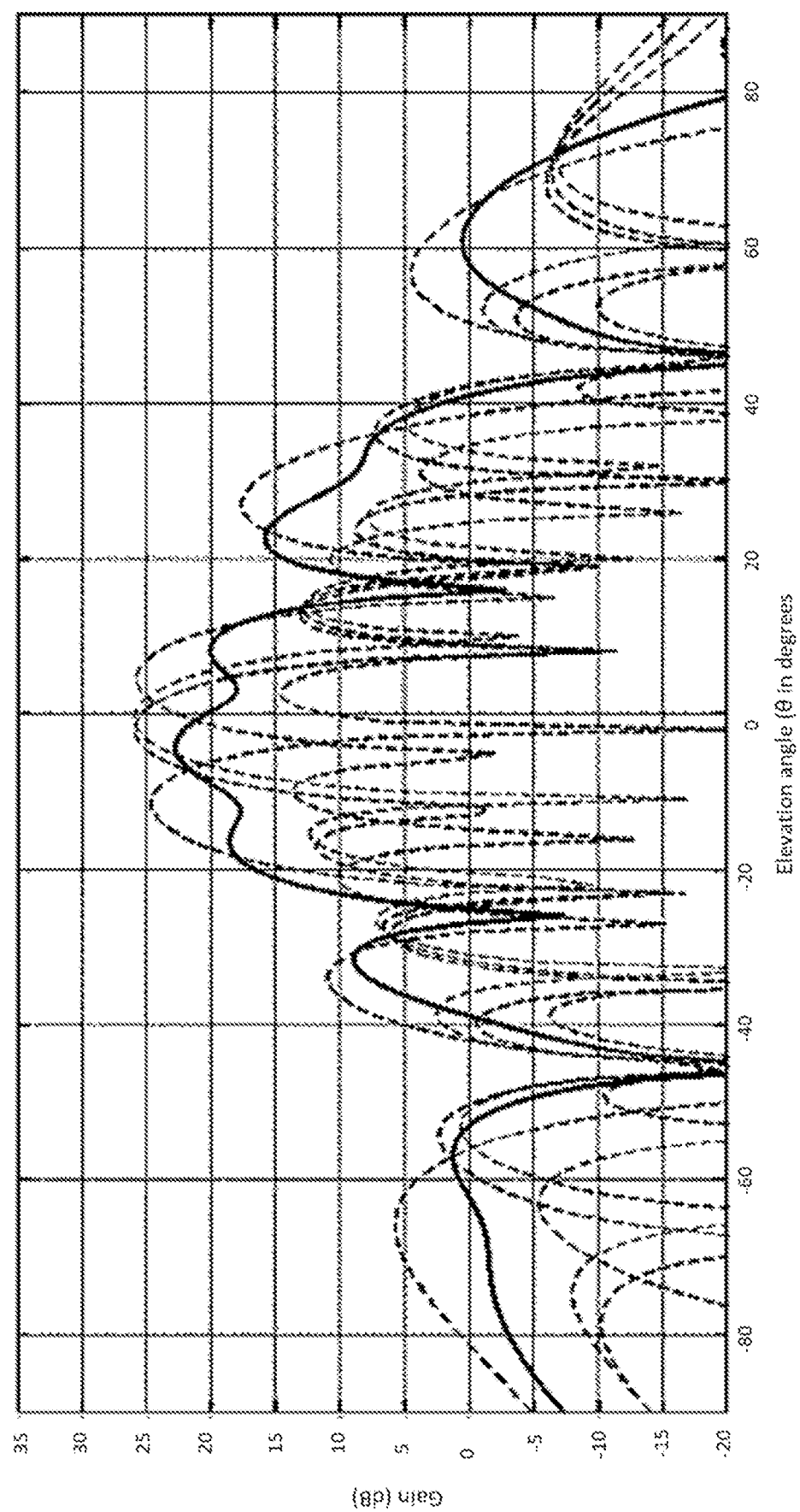
FIG. 16 illustrates an exemplary wide elevation beam encompassing four narrow elevation beams.

An exemplary wide elevation beam encompassing four narrow elevation beams with the proposed HBF architecture is illustrated in the graph of FIG. 16. In this graph, the 4 narrow beams illustrated using dotted lined have maximum beam gain at the following elevation angles: Beau =[4.8750°, − 0.6250°, −2.1250°, −12.3750°]. The broad beam has reduced BF gain but has wider coverage as seen from the figure. It covers the main beam of all the 4 narrow beams with a minimum loss of 3 dB compared to the maximum beam gain and a maximum loss of 9 dB compared to the maximum beam gain. The beam weights of the broad elevation beam are as follows $$WZ=[1.0+0.0*j, 0.55-0.83*j, 0.99-0.10*j, -0.46+0.89*j]$$

The hybrid beamforming architecture described in the above exemplary embodiments may enable the use of 16TX/16RX module for dynamic vertical coverage. Further, the exemplary embodiments described above may also be applied to a 32T32R front end thereby allowing obtaining 64T64R like performance.

Figure 17:
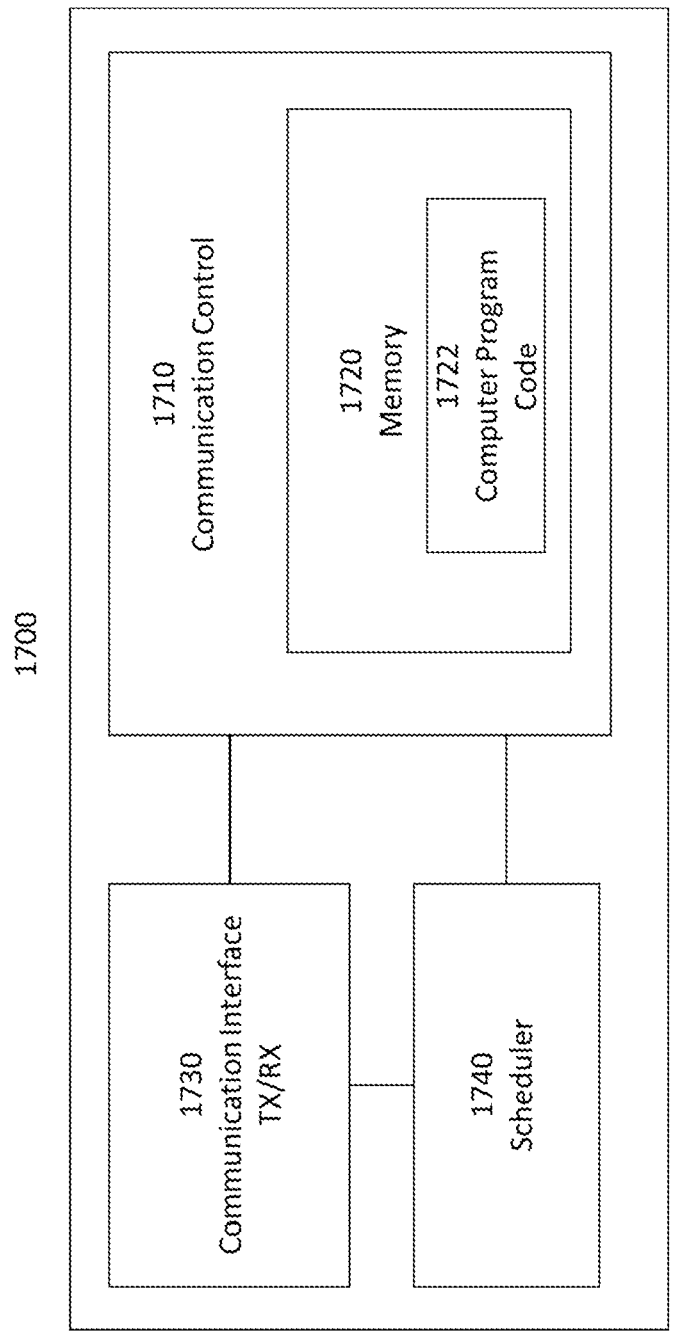
FIG. 17 illustrates an example embodiment of an apparatus.

The apparatus 1700 of FIG. 17 illustrates an example embodiment of an apparatus that may be an access node or be comprised in an access node. The apparatus may be, for example, a circuitry or a chipset applicable to an access node to realize the described embodiments. The apparatus 1700 may be an electronic device comprising one or more electronic circuitries. The apparatus 1700 may comprise a communication control circuitry 1710 such as at least one processor, and at least one memory 1720 including a computer program code (software) 1722 wherein the at least one memory and the computer program code (software) 1722 are configured, with the at least one processor, to cause the apparatus 1700 to carry out any one of the example embodiments of the access node described above.

The memory 1720 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 1700 may further comprise a communication interface 1730 comprising hardware and/or software for realizing communication connectivity according to one or more communication protocols. The communication interface 1730 may provide the apparatus with radio communication capabilities to communicate in the cellular communication system. The communication interface may, for example, provide a radio interface to terminal devices. The apparatus 1700 may further comprise another interface towards a core network such as the network coordinator apparatus and/or to the access nodes of the cellular communication system. The apparatus 1700 may further comprise a scheduler 1740 that is configured to allocate resources.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one processor; and
at least one memory including a computer program code, wherein the at least one memory and the computer program code are configured, with the at least one processor, to cause the apparatus to:
select, based on beam metric, a beam to be scheduled for a slot that is upcoming, wherein the beam metric is defined as a weighted sum of scheduler metrics, associated with terminal devices and wherein weights reflect a required number of physical resource blocks for the terminal devices;
select a terminal device to be scheduled in the selected beam, wherein the selection of the terminal device is based on the terminal device having considered the selected beam as a best beam, and allocate physical resource blocks to the terminal device;
choose a beam configuration to be used for the selected beam based, at least partly, on user traffic and load distribution; and
trigger a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

2. The apparatus according to claim 1, wherein the apparatus is further caused to trigger the switching event with a start of a symbol of the slot.

3. The apparatus according to claim 1, wherein the apparatus is further caused to trigger at least one additional switching event during the slot.

4. The apparatus according to claim 1, wherein:
a plurality of other terminal devices are arranged in a descending order based on one of the following metrics: single user proportional fair metrics, a delay based metric or a spectral efficiency metric; and
the apparatus is further caused to:
allocate physical resource blocks to terminal devices having considered the selected beam as the best beam; and
when there are unutilized physical resource blocks left, allocate those the unutilized physical resource blocks to terminal devices not considering the selected beam as the best beam in a descending order according to a spectral efficiency of a current beam or proportional fair metrics or based on delays associated with each of the terminal devices not considering the selected beam as the best beam.

5. The apparatus according to claim 1, wherein the beam configuration comprises on-one of the following:
a wide beam and narrow beams, narrow beams, or a beam configuration that is chosen adaptively or statistically, and wherein the wide beam is a beam with a width above a threshold value and a narrow beam is a beam with a width less than the threshold value.

6. The apparatus according to claim 1, wherein the selected beam is associated with a unique identification number and the unique identification number is associated with control bits that are used to control the switch network.

7. The apparatus according to claim 1, wherein the selected beam is an analogue beam in an elevation domain.

8. The apparatus according to claim 1, wherein the selected beam is selected based on the selected beam having a largest beam metric of a plurality of beams available for scheduling in the slot.

9. The apparatus according to claim 1, wherein at least one of the phase shifters comprised in the plurality of phase shifters comprise two switches and delay lines with input, output and a a-bit control line.

10. The apparatus according to claim 1, wherein the radio frequency front end unit is comprised in an access node and the apparatus is comprised in or connected to the access node.

11. A method, comprising:
selecting, by an apparatus, based on beam metric, a beam to be scheduled for a slot that is upcoming, wherein the beam metric is defined as a weighted sum of scheduler metrics, associated with terminal devices and wherein weights reflect a required number of physical resource blocks for the terminal devices;
selecting, by the apparatus, a terminal device to be scheduled in the selected beam, wherein the selection of the terminal device is based on the terminal device having considered the selected beam as a best beam, and allocating physical resource blocks to the terminal device;
choosing, by the apparatus, a beam configuration to be used for the selected beam based, at least partly, on user traffic and load distribution; and
triggering, by the apparatus, a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

12. The method according to claim 11, wherein a plurality of other terminal devices are arranged in a descending order based on one of the following metrics: single user proportional fair metrics, a delay based metric or a spectral efficiency metric; the method further comprising:
allocating physical resource blocks to terminal devices having selected considered the selected beams as the best beam; and
when there are unutilized physical resource blocks left, allocating those the unutilized physical resource blocks to terminal devices not considering the selected beam as the best beam in a descending order according to a spectral efficiency of a current beam or proportional fair metrics or based on delays associated with each of the terminal devices not considering the selected beam as the best beam.

13. The method according to claim 11, wherein the method further comprises:
   allocating physical resource blocks to terminal devices having considered the selected beam as the best beam; and
   when there are unutilized physical resource blocks left, allocating those the unutilized physical resource blocks to terminal devices not considering the selected beam as the best beam in a descending order according to a spectral efficiency of a current beam or proportional fair metrics or based on delays associated with each of the terminal devices not considering the selected beam as the best beam.

14. The method according to claim 11, wherein the method further comprises triggering at least one additional switching event during the slot.

15. A non-transitory computer readable medium comprising program instructions that, when executed by at least one processor, causes an apparatus to perform at least the following:
   selecting, based on beam metric, a beam to be scheduled for a slot that is upcoming, wherein the beam metric is defined as a weighted sum of scheduler metrics, associated with terminal devices and wherein weights reflect a required number of physical resource blocks for the terminal devices;
   selecting a terminal device to be scheduled in the selected beam, wherein the selection of the terminal device is based on the terminal device having considered the selected beam as a best beam, and allocating physical resource blocks to the terminal device;
   choosing a beam configuration to be used for the selected beam based, at least partly, on user traffic and load distribution; and
   triggering a switching event, prior to or during, the slot, wherein the switching event comprises producing the chosen beam configuration by providing a beamforming command and using a control line controlling a switch network comprised in phase shifters to steer the beam, and wherein the phase shifters are comprised in a radio frequency front-end unit that comprises a plurality of antenna columns, and the phase shifters are placed in front of selected antenna sub-arrays comprised in the plurality of antenna columns.

\* \* \* \* \*